Aug. 4, 1959  I. EACHUS, JR  2,898,577
METHOD AND APPARATUS FOR RECORDING AND REPRODUCING DATA
Filed Jan. 30, 1952  12 Sheets-Sheet 1

INVENTOR
IREDELL EACHUS, JR.
BY HIS ATTORNEYS
Howson & Howson

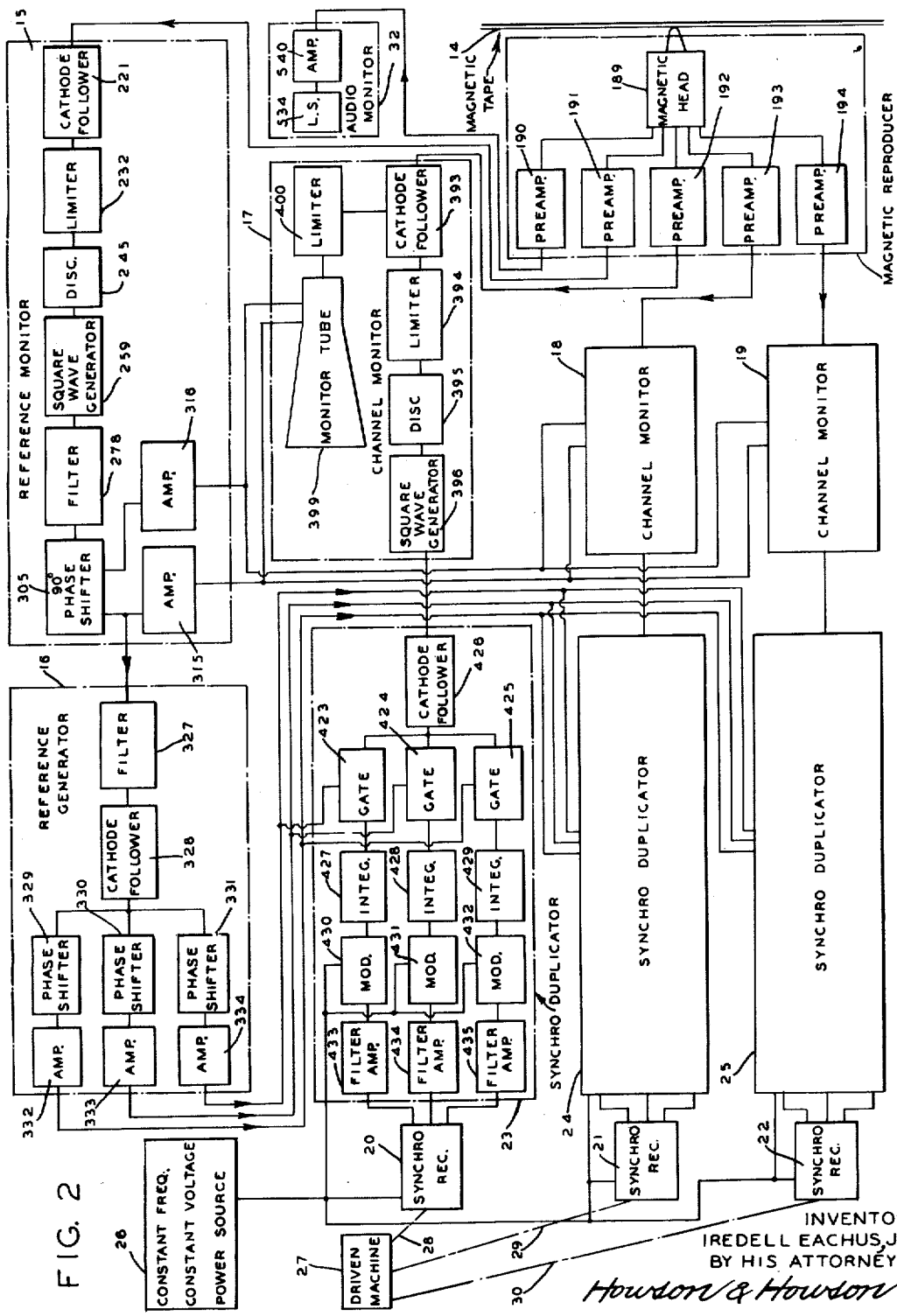

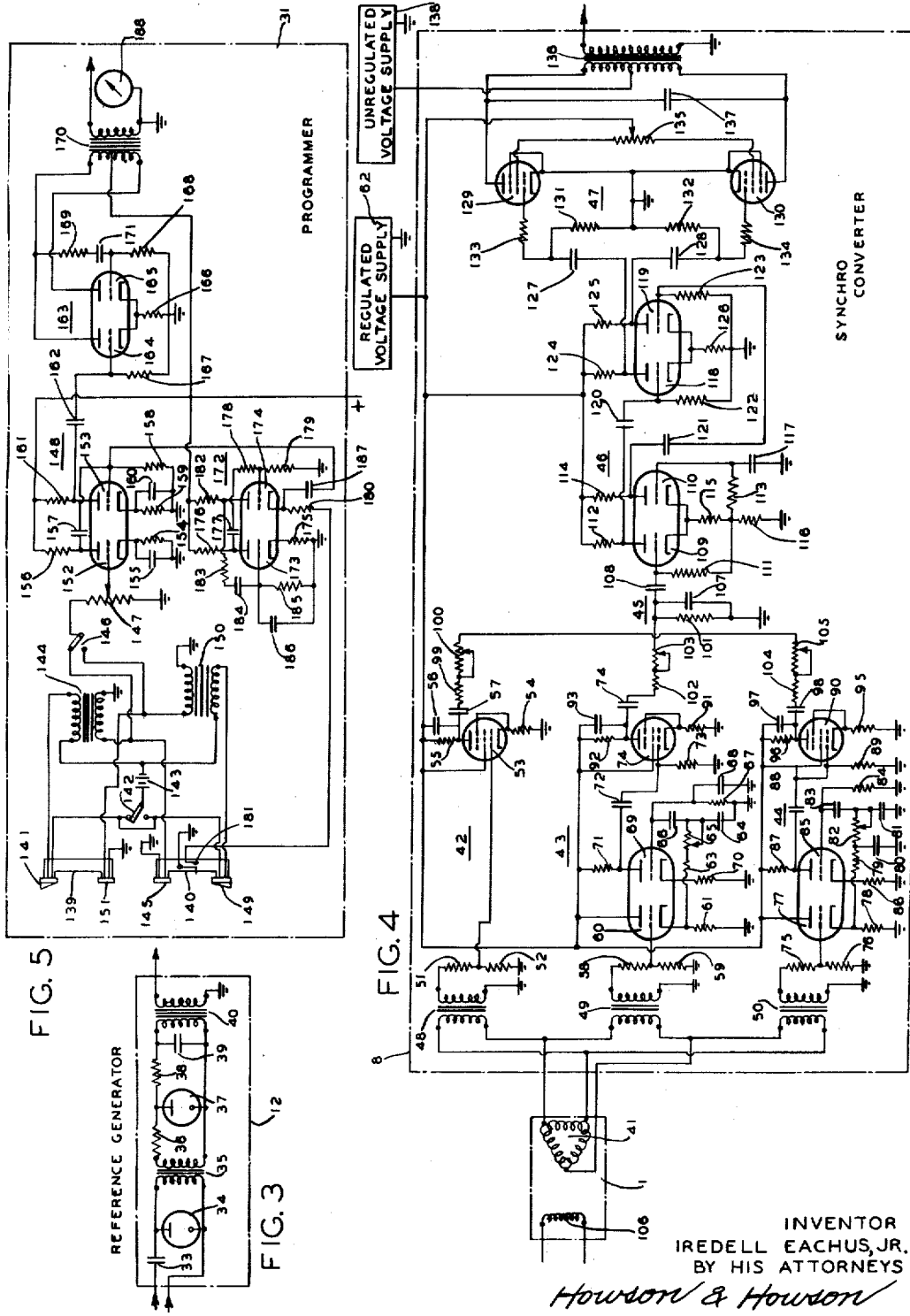

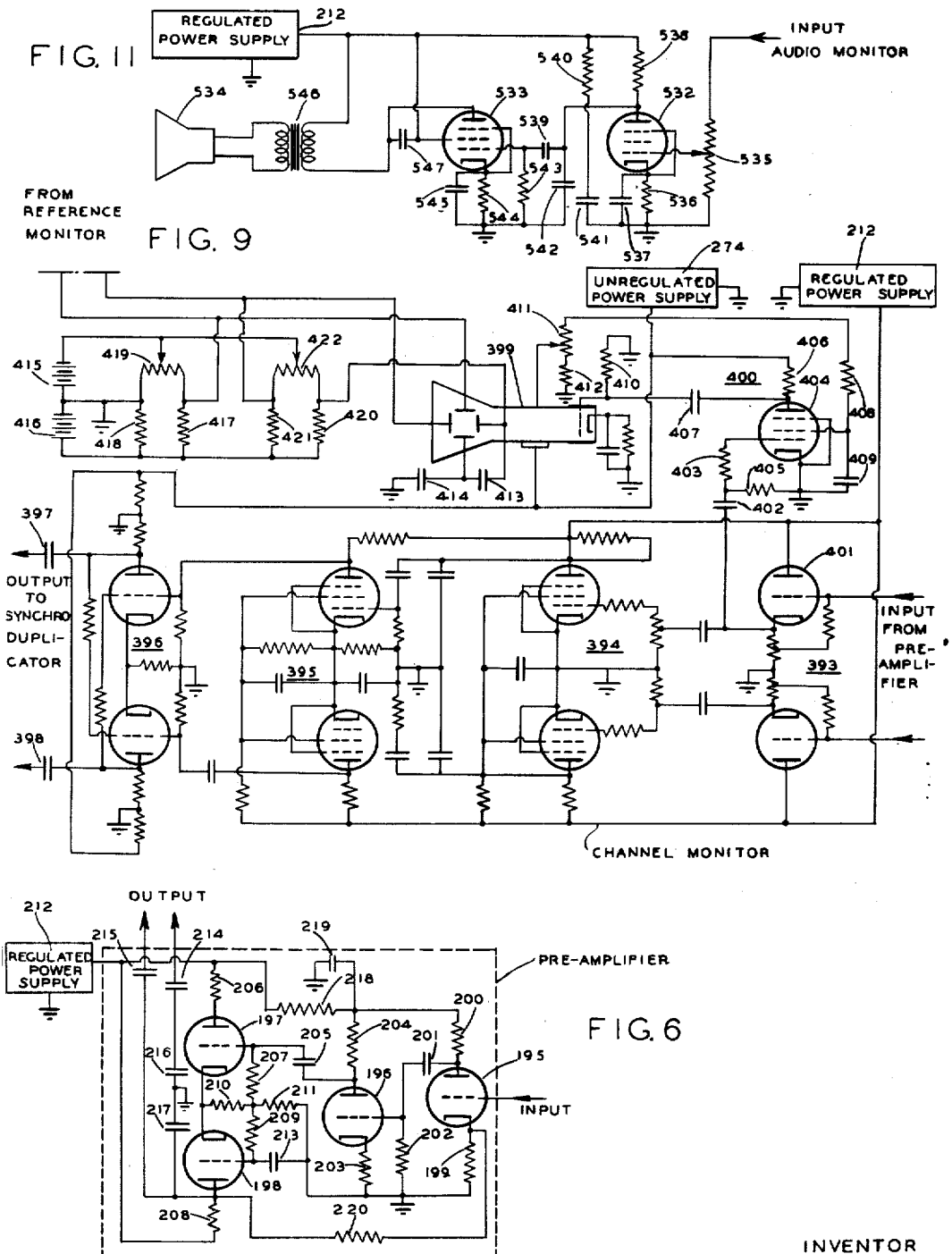

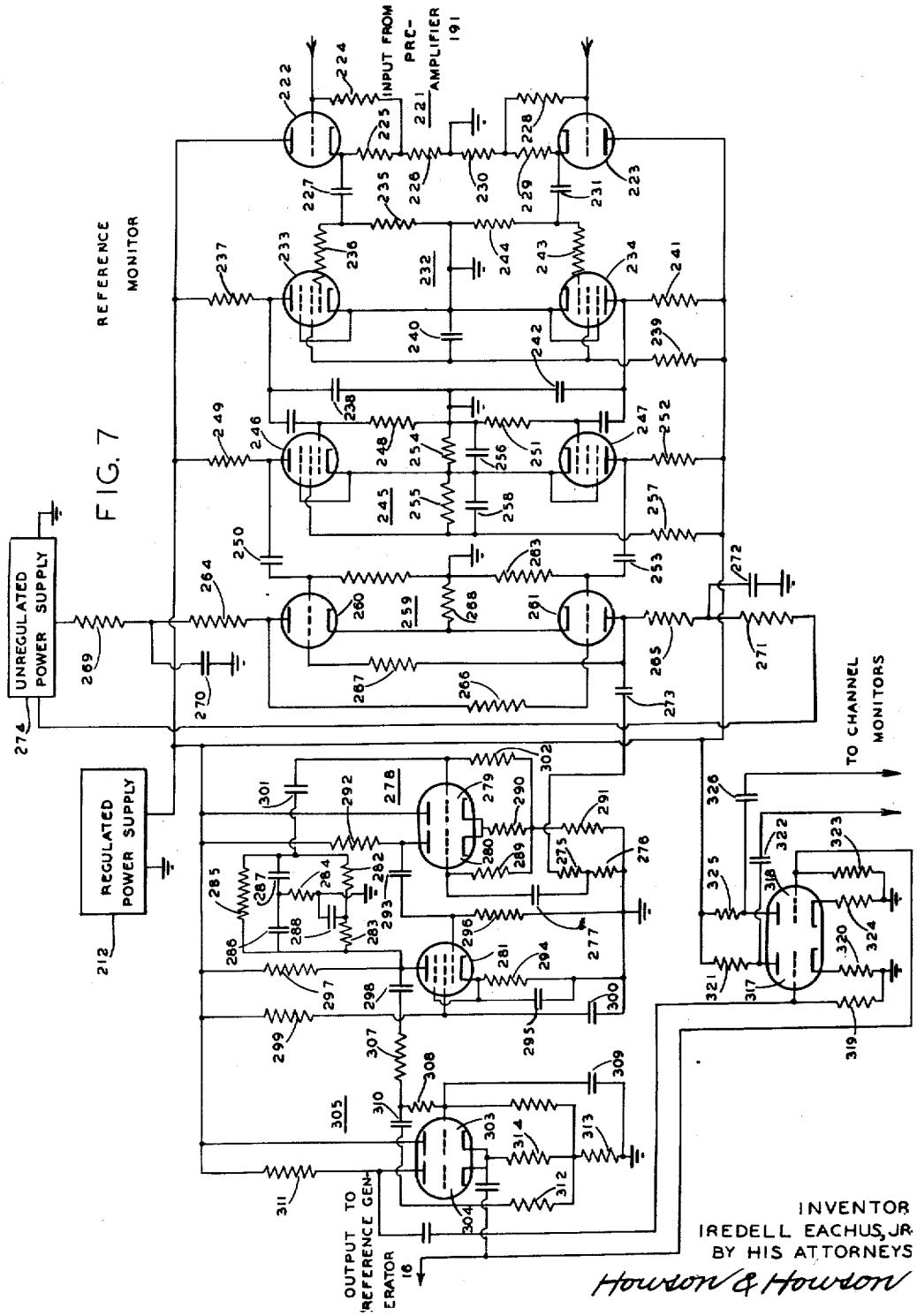

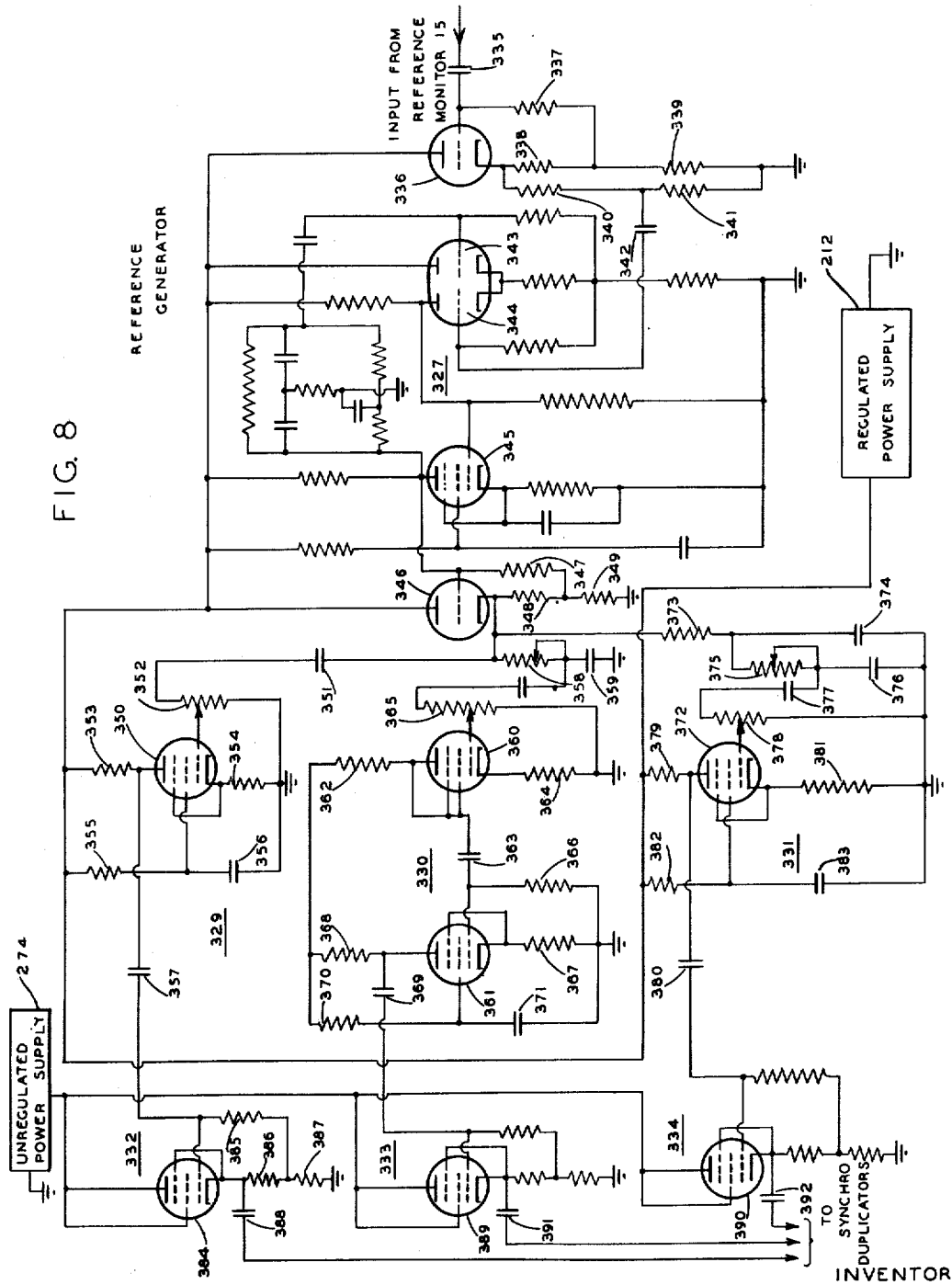

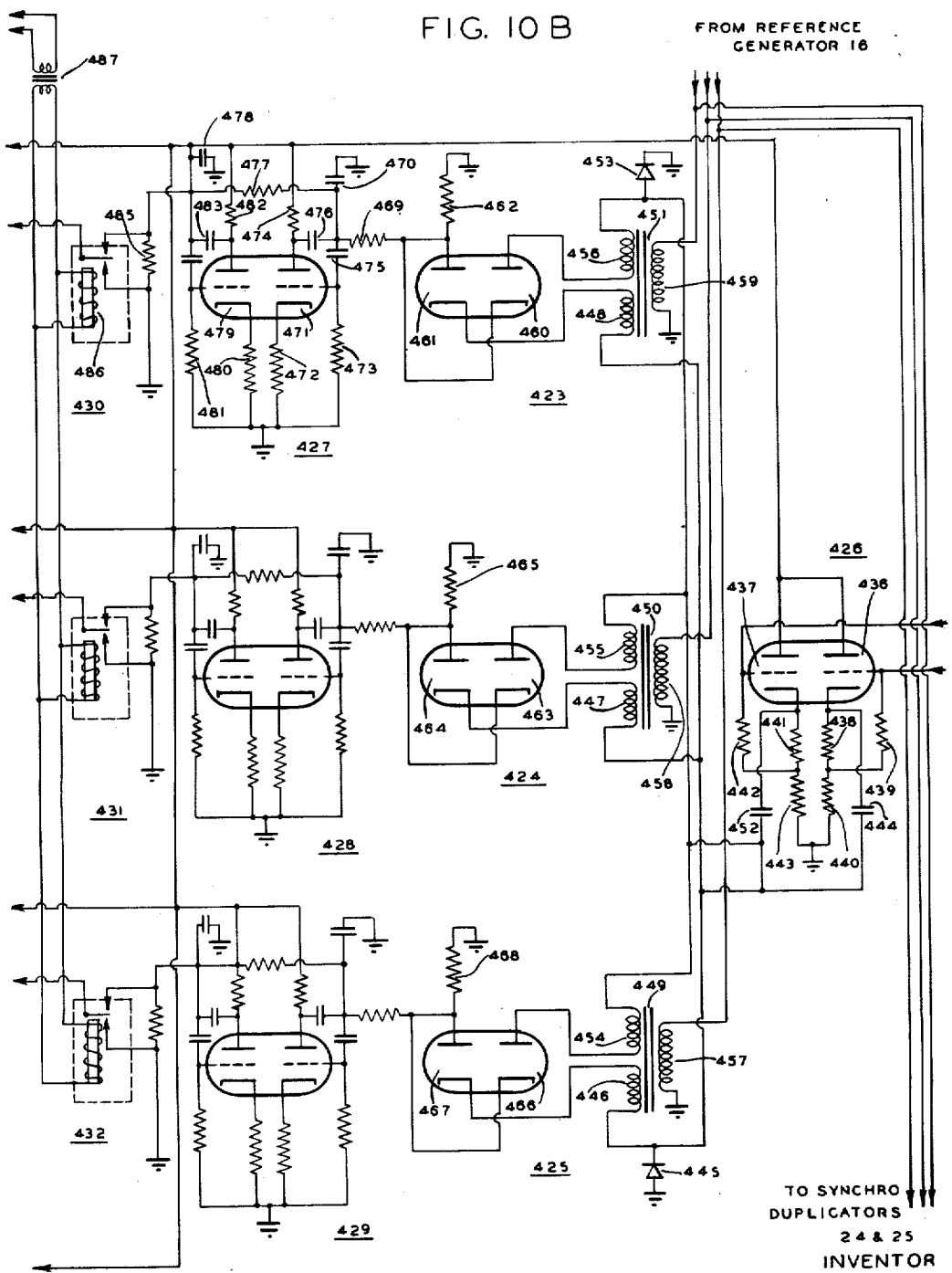

Aug. 4, 1959   I. EACHUS, JR   2,898,577
METHOD AND APPARATUS FOR RECORDING AND REPRODUCING DATA
Filed Jan. 30, 1952   12 Sheets-Sheet 9
FIG. 12
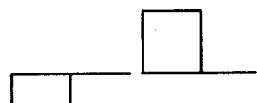
A-1   A-2
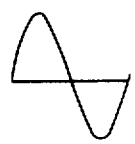   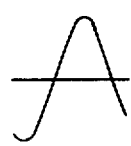   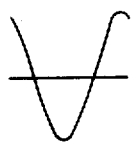
B-1   B-2   B-3
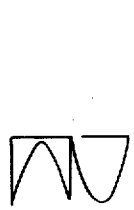    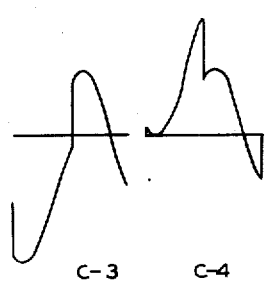   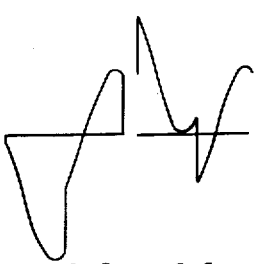
C-1   C-2   C-3   C-4   C-5   C-6
 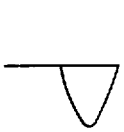   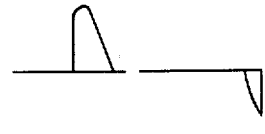   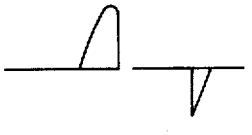
D-1   D-2   D-3   D-4   D-5   D-6
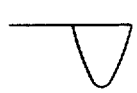   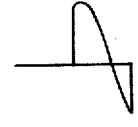   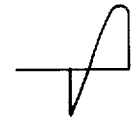
E-1   E-2   E-3
INVENTOR
IREDELL EACHUS, JR.
BY HIS ATTORNEYS
Howson & Howson INVENTOR
IREDELL EACHUS, JR.
BY HIS ATTORNEYS
Howson & Howson Aug. 4, 1959  I. EACHUS, JR  2,898,577
METHOD AND APPARATUS FOR RECORDING AND REPRODUCING DATA
Filed Jan. 30, 1952  12 Sheets-Sheet 11

INVENTOR
IREDELL EACHUS, JR.
BY HIS ATTORNEYS
Howson & Howson

Aug. 4, 1959
I. EACHUS, JR
2,898,577
METHOD AND APPARATUS FOR RECORDING AND REPRODUCING DATA
Filed Jan. 30, 1952
12 Sheets-Sheet 12
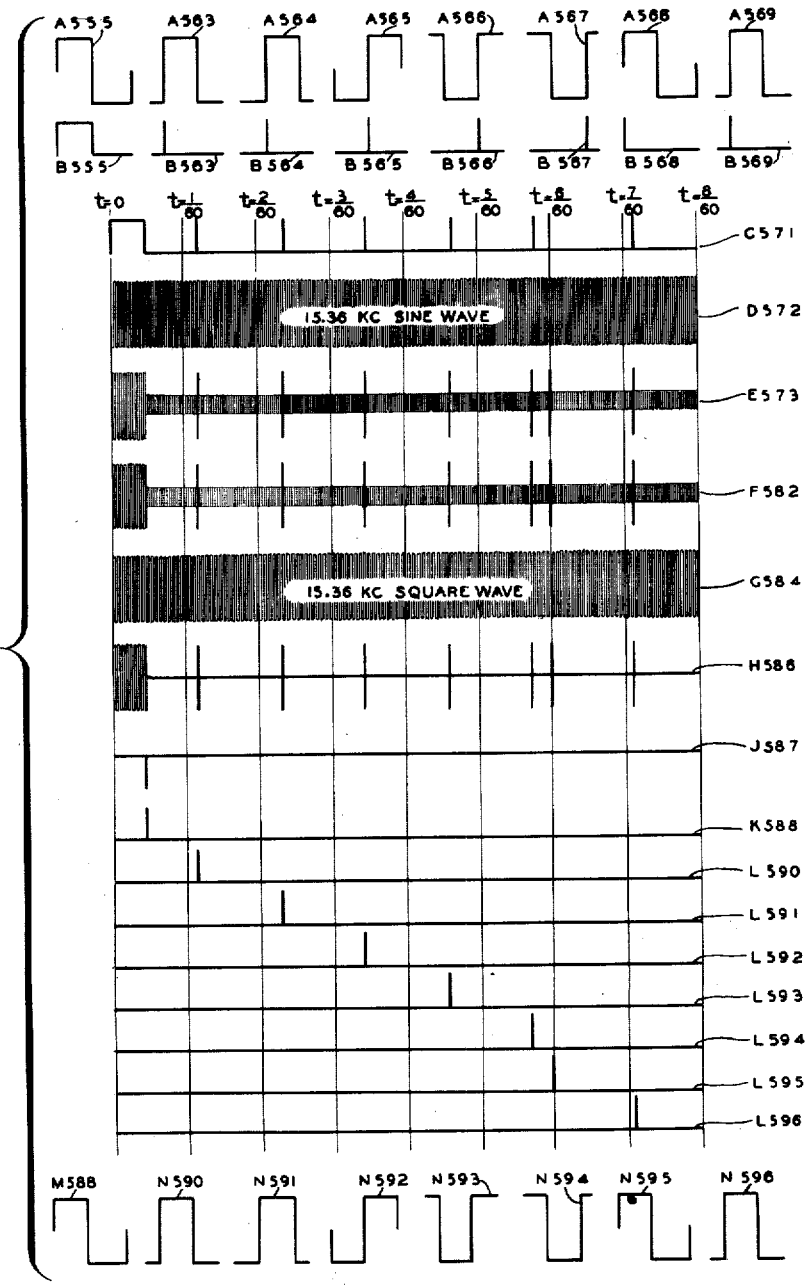
INVENTOR
IREDELL EACHUS, JR.
BY HIS ATTORNEYS
Howson & Howson

United States Patent Office 2,898,577
Patented Aug. 4, 1959

2,898,577

METHOD AND APPARATUS FOR RECORDING AND REPRODUCING DATA

Iredell Eachus, Jr., Cynwyd, Pa.

Application January 30, 1952, Serial No. 268,994

21 Claims. (Cl. 340—174)

This invention relates to systems for collecting data available as electric signals and reproducing the electric waves representing the data at a later time in a form similar to the original electric signals. More specifically the invention relates to a device which may be used to receive one or more sets of synchro voltages, convert these voltages to related electric waves of a form ideal for recording on a medium which preferably saturates with large signals, and equipment for the transformation of the electric waves resulting in the replay of the recording into voltages which are essentially a duplicate of the original synchro voltages and suitable for energizing a synchro receiver. Thus, in a system where data is being transmitted as synchro voltages between two units, the normally available synchro signals may be connected into the device herein described and at any later time (or times) the outputs of the Data Recorder and Data Reproducer may be connected in a manner to supply signal voltages into units generally in use which are responsive to synchro signals. The synchro receiver will respond in a like manner whether receiving a signal from a synchro which is the usual source or from the Data Reproducer. The use of synchros is not a limitation to the invention as the method may be applied to the voltages from any electrically similar unit having a single rotor excitation and a symmetrical field structure which produces a set of voltages equivalent to a rotating vector of constant magnitude and angle related to the rotor position. The invention provides for the recording and duplication of a set of one or several synchro voltages as a function of time, together with a reference time base and with or without an additional programming channel. The programming channel is used to identify the data recorded on the other channels, to record related quantities or sequences which are of interest in relation to the recorded synchro signals and for recording such other data and instructions as may be required to obtain maximum benefit from the entire record.

This invention provides for the first time a method and apparatus by which it is possible to receive synchro voltages from some source, record the intelligence contained therein, and directly reproduce similar synchro voltages.

As described hereinafter, my invention is adaptable either to the simultaneous recording of different signals upon several tracks or channels, or to the recording of several different signals upon a single recording channel or track. In the latter case, when the recording mechanism is located at a distance from the device generating the data to be recorded, transmission of the several channels of intelligence may be effected on a single pair of conductors instead of the larger number of conductors which would otherwise be required. Or if radio transmission were desired, the signal emitted from the recording device would be suitable for transmission over a single carrier frequency.

One object of my invention is to provide a method and apparatus for recording any datum which may be represented by synchro voltages, with or without any related or independent data, for the purpose of supplying electric impulses to a group or combination of synchro receivers which will reduce the data to a useful form or perform a desired operation or function.

Another object of my invention is to provide an automatic control method and apparatus for directing the operation of a mechanism or group of mechanisms, or machine in any manner in which the same may be operated manually or by another control system or when acting under the influence of forces of nature or by any combination of the above forces which might normally actuate the mechanism.

Another object of my invention is to provide an automatic control by which a machine, a group of machines, or a mechanism equipped to be operated from electrical synchro signals may be operated from a previously made record.

Another object of my invention is to provide a method and apparatus for recording any datum which may be represented by synchro voltages, with or without any related or independent data, for the purpose of supplying electric impulses to a calculating device equipped to receive such information.

Another object of my invention is to provide a novel method and apparatus in the operation of machines in which sequential operations differing in time and in character may be performed successively from a single record.

Further and other objects will appear from the following description.

In the accompanying drawings,

Fig. 2 is a block diagram of the reproducing system of the same embodiment;

Fig. 3 is a diagrammatic illustration of the reference generator employed;

Fig. 4 is a diagrammatic illustration of one of the synchro converters employed;

Fig. 5 is a diagrammatic illustration of the programmer;

Fig. 6 is a diagrammatic illustration of one of the preamplifiers employed in the reproducing system;

Fig. 7 is a diagrammatic illustration of the reference monitor;

Fig. 8 is a diagrammatic illustration of the reference generator employed in the reproducing system;

Fig. 9 is a diagrammatic illustration of one of the channel monitors;

Figure 10A:
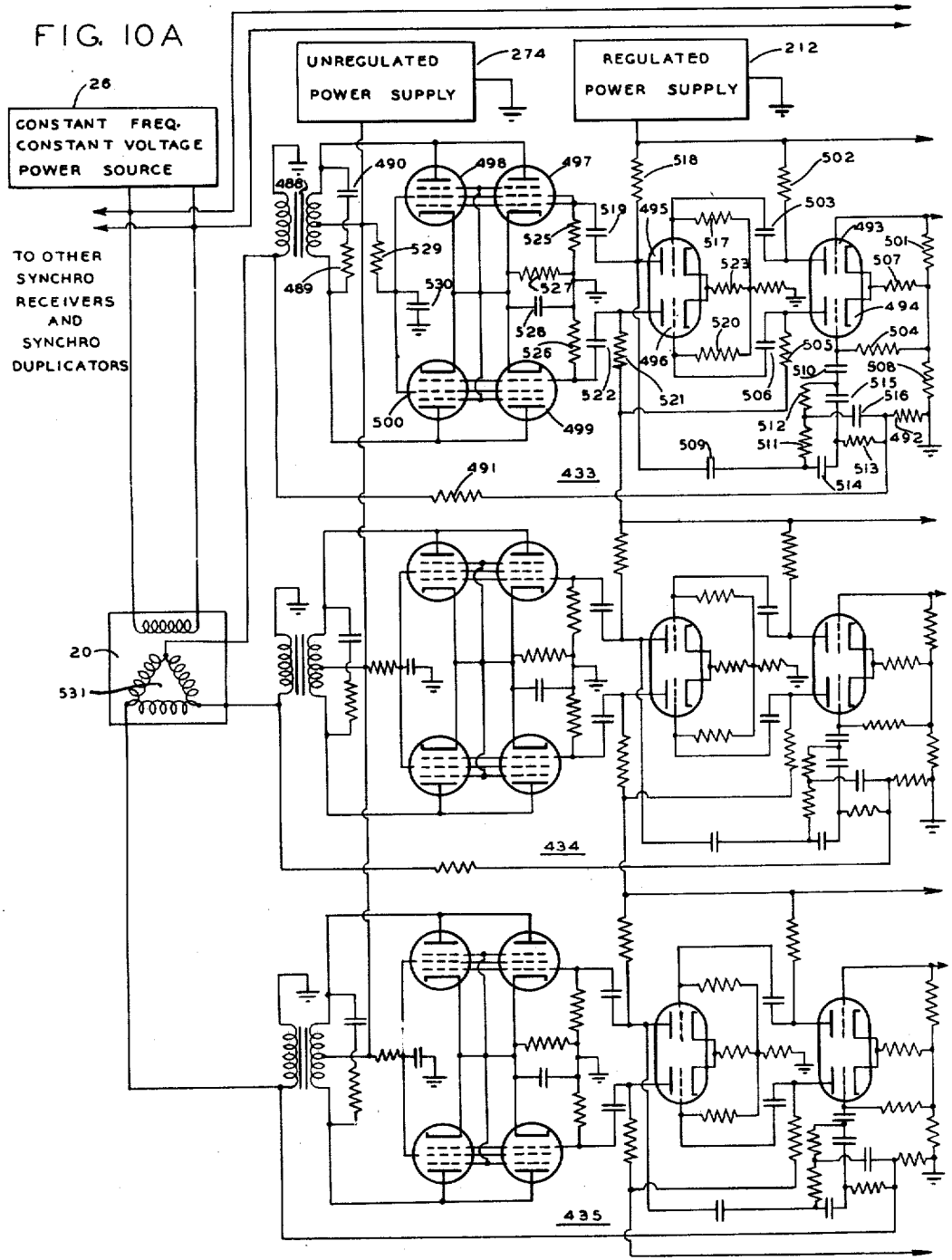
Figure 13:
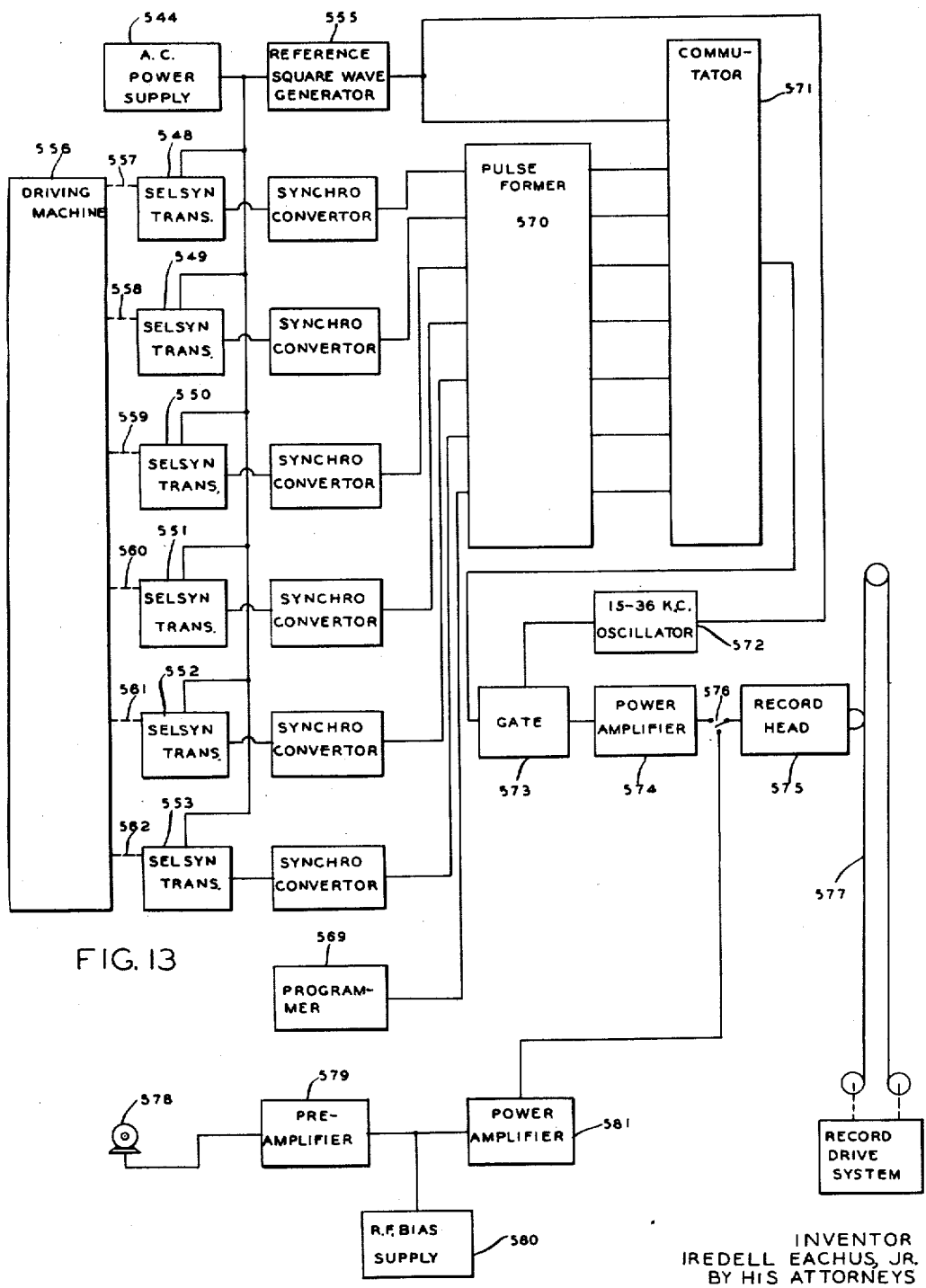
Figure 14:
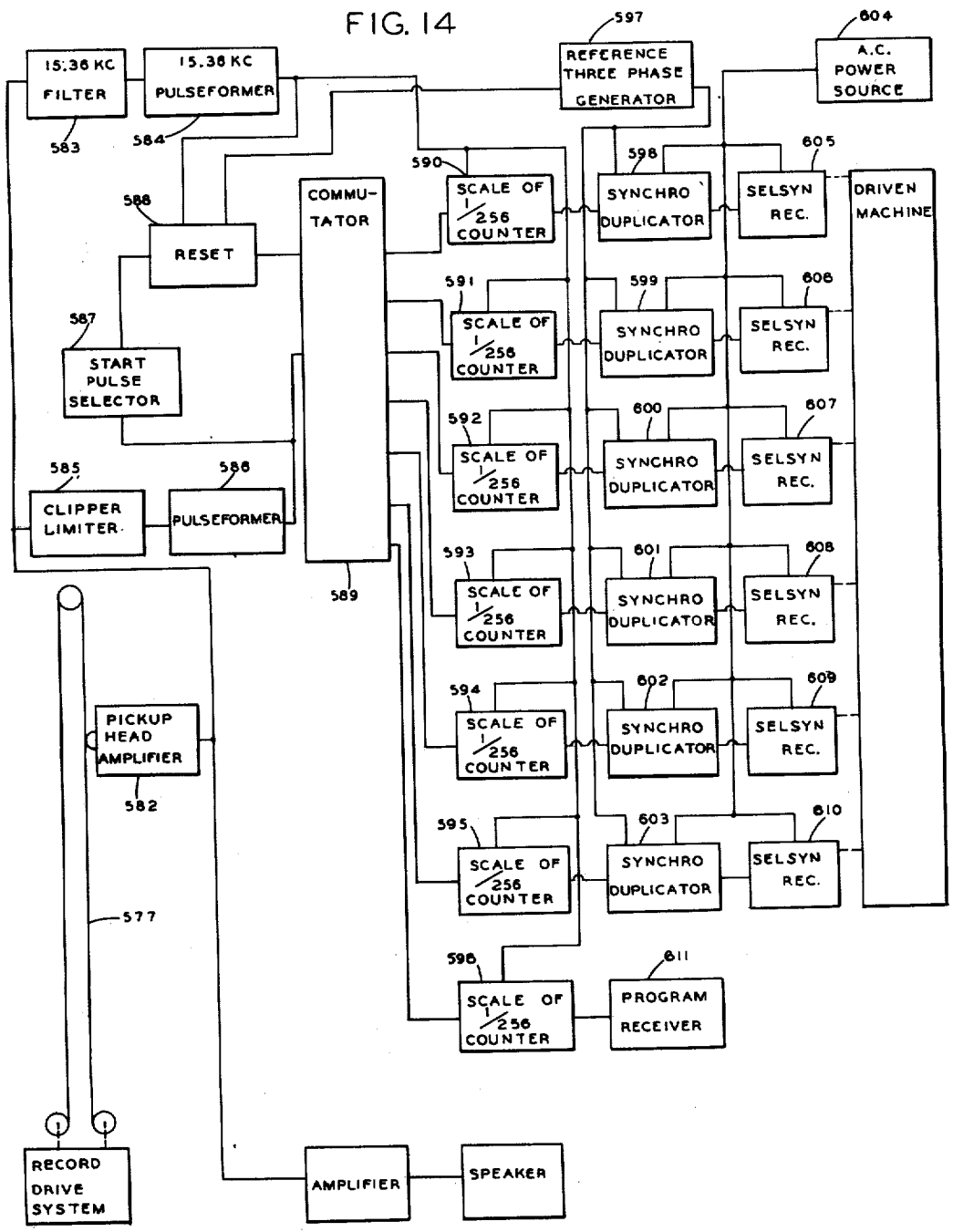

Figs. 10a and 10b together constitute a diagrammatic illustration of one of the synchro duplicators;

Fig. 11 is a diagrammatic illustration of the audio monitor;

Fig. 12 shows wave forms that appear in the system during operation;

Fig. 13 is a block diagram of another embodiment of the recording system;

Fig. 14 is a block diagram of the reproducing system of the latter embodiment; and Fig. 15 shows voltage wave forms that appear at several points in the overall system of the latter embodiment during operation.

Figure 1:
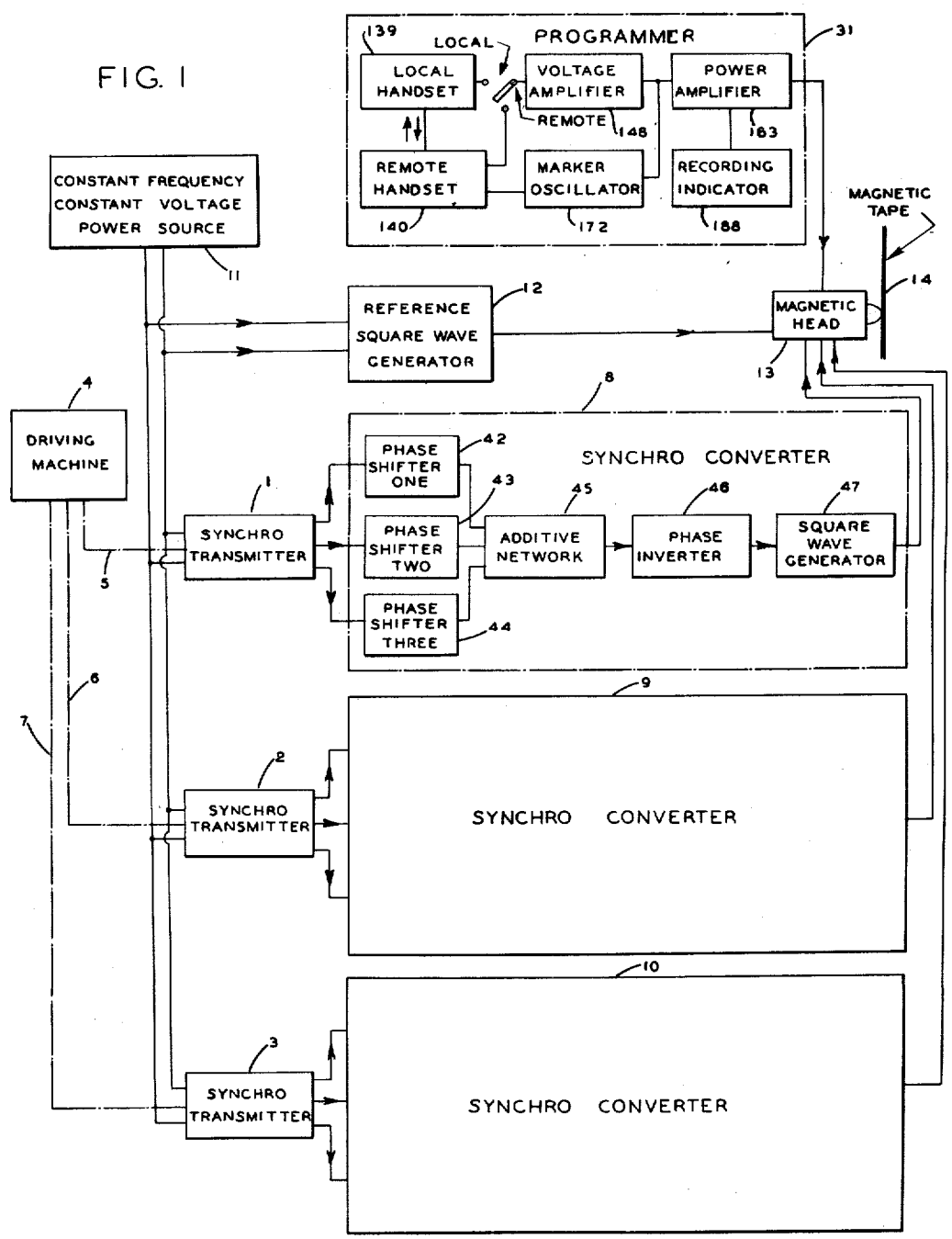
Fig. 1 is a block diagram of the recording system of one embodiment of the invention.

*General description of system of Figs. 1 and 2*

Reference is first made to Figs. 1 and 2 for an understanding of the general operation of a system according to the present invention. By way of example, the invention is illustrated in its application to the recording of the movements of one or more parts of a driving machine, and the automatic operation from the record of a corresponding part or parts of a driven machine, although it will be understood that the invention is applicable to the recording and reproduction of any data or intelligence represented by synchro voltages. Where two or more moving parts of a driven machine are to be controlled according to corresponding parts of a driving machine, it is merely necessary to provide a corresponding plurality of information channels, the channels being similar. For the purpose of illustration, Figs. 1 and 2 show an overall system in which the movements of three parts of a driving machine are recorded, and three corresponding parts of a driven machine are controlled from the record. The signals from the synchro transmitters 1, 2 and 3, which are indicative of the relative positions of the parts of the driving machine 4 to which the synchro transmitters are mechanically connnected, as indicated by the dot-and-dash lines 5, 6 and 7, are fed to the synchro converters 8, 9 and 10. The voltage impressed upon the rotors of the synchro transmitters from source 11 is also applied to the reference square wave generator 12 which generates a reference signal of square wave shape. The output of each synchro converter is an alternating voltage of square wave shape and of constant maximum amplitude but of varying phase with respect to said reference voltage, this difference in phase being the medium through which the information concerning the relative position, velocity and acceleration is transmitted. The square waves from the synchro converters, and the square wave reference signal, are applied to the magnetic recorder head 13 and are used to saturate a multi-channel magnetic recording medium 14 driven at a constant speed, thus recording the information. Because of the characteristics of magnetic recording each signal produced from the recording will be the derivative of the square wave, i.e. a series of alternately positive and negative pulses. The term "square wave" as used above, and throughout this application, is not intended to be limited to waves of square shape. The term is meant, instead, to have reference to waves having a rapid rise time which is small compared to the time required to make movements which are recorded by the square waves. Thus the wave form need not have flat tops as do true square waves. The rise, however, is preferably to a level which saturates (or cuts off, as the case may be) the amplifiers or the storage medium. In fact, it is this feature of the invention which makes the actual wave shape of little importance and gives it freedom from inaccuracies introduced by distortion. Effectively, then, the wave is one in which there is a rapid change of polarity, the polarity changing from positive to negative, and vice versa, once per cycle. The intelligence is carried by the position of the wave front of the wave representing data relative to the position of the wave front of a reference voltage which is another square wave.

The reference signal derived from the recording, consisting of a series of pulses, if fed into the reference monitor 15. The latter provides a sine wave output which in turn is fed into the three phase reference generator 16. In the three phase reference generator, the sine wave input signal is used to generate three signals 120 electrical degrees apart.

The series of pulses which constitute an information signal corresponding to the square wave from each synchro converter are impressed upon one of the channel monitors 17, 18 and 19 which changes this series of pulses into a square wave. This square wave information signal from each channel monitor, the three phase signal from the reference generator 16, and a signal corresponding to that impressed upon the rotors of synchro receivers 20, 21 and 22, are fed into one of the synchro duplicators 23, 24 and 25, and used in a manner described below to produce three voltages of constant phase but varying in amplitude with respect to each other. These voltages are duplicates of the three voltages of varying amplitude from the corresponding synchro transmitter which were impressed upon the associated synchro converter. The output of each synchro duplicator is impressed upon the stator of the associated synchro receiver whose rotor is energized by voltage from a constant frequency, constant voltage power source 26. The rotors of the synchro receivers 20, 21 and 22 are mechanically connected to parts of the driven machine 27, as indicated by the dot-and-dash lines 28, 29 and 30. The driven machine is thus controlled as though there were a direct connection between each synchro transmitter and the corresponding synchro receiver.

Provision is made for the recording and reproducing of spoken instructions or other programming information. To this end, a programmer 31 is provided in the recording system of Fig. 1, and the output of the programmer is recorded upon magnetic media 14. The programming signal is reproduced in the reproducing system of Fig. 2 and is supplied to an audio monitor 32.

As shown in Figs. 1 and 2, various units of the overall system comprise component parts represented by labeled blocks or rectangles. In the recording system of Fig. 1, the three synchro duplicators are similar, and the three ponent elements or parts of only one of them are represented. Likewise, in the reproducing system of Fig. 2, the three synchro duplicators are similar, and the three channel monitors are also similar, and the component parts of only one synchro duplicator and one channel monitor are represented.

*Reference square wave generator*

The reference square wave generator 12 of the recording system shown in Fig. 1 is shown in detail in Fig. 3 to which reference is now made in conjunction with Fig. 1. The voltage from the constant frequency constant amplitude source 11 is impressed upon a current-limiting capacitor 33 which is in series with a gas discharge tube 34. The voltage from the secondary winding of transformer 35 is impressed across resistor 36 and gas discharge tube 37 in series. The voltage appearing across gas discharge tube 37 is impressed upon a D.C. restorer consisting of resistor 38 and capacitor 39. The output of the restorer circuit is impressed upon the primary of transformer 40, and the signal output of the reference generator appears across the secondary of this transformer and is applied to the magnetic recording head 13 of Fig. 1.

Considering the operation of the reference signal generator, when a voltage from the constant frequency constant voltage power source 11 is applied to the reference signal generator, the gas discharge tube 34 will conduct for those portions of the cycle during which the voltage impressed across the tube 34 exceeds the ignition voltage. While the gas is ionized, the resistance of tube 34 is relatively low and this will tend to square the sinusoidal wave impressed upon tube 34. Because of the physical construction of gas discharge tube 34, it will offer different resistances to voltages of different polarities, and hence the wave shape of the signal impressed on the primary winding of transformer 35 will not be symmetrical. Capacitor 33 serves as a current limiting condenser to protect the gas discharge tube 34 from the high curent which would otherwise flow through tube 34 while the gas therein is ignited. The voltage impressed upon the primary winding of transformer 35 is stepped up by the transformer and is impressed upon the current-limiting resistor 36 and gas discharge tube 37 which serves to further square the wave shape and make both positive and negative portions of the cycle symmetrical since transformer 35 will have shifted the phase of the signal 180 degrees, so that the portion of the wave that had been poorly squared by gas discharge tube 34 will be given the more favorable treatment by gas discharge tube 37, while the portion of the wave that had been made more nearly square by gas discharge tube 34 will be less favorably treated by gas discharge tube 37.

The voltage limited by gas discharge tube 37 is impressed upon capacitor 39 through resistor 38, and the capacitor charges to the value of the peak voltage across gas discharge tube 37 less the voltage drop across resistor 38. When the voltage across gas discharge tube 37 starts to fall below the voltage across capacitor 39, the energy stored in the capacitor 39 is released and flows into the primary winding of transformer 40, its flow in the other direction toward transformer 35 being impeded by resistors 36 and 38. The flow of stored energy from capacitor 39 into transformer 40 at a time when the voltage across the gas discharge tube 37 starts to drop will tend to maintain a constant voltage across the primary winding of transformer 40, thus further squaring the wave impressed upon the output of transformer 40. The square wave from the secondary of transformer 40 constitutes the reference signal which is supplied to the recorder head 13 and is recorded on the magnetic tape 14.

The synchro converters

As previously mentioned, the synchro converters 8, 9 and 10 of Fig. 1 are similar, and since the synchro converters 8 is typical of all of them, it is shown in detail in Figs. 1 and 4. This converter is an electronic unit designed to convert a three-wire, constant phase, variable amplitude signal from the three-winding stator 41 of synchro transmitter 1 into a two-wire phase modulated square wave. Referring to the block diagram of Fig. 1, the signals from the stator windings of the synchro transmitter which are fed into three phase-shifting networks 42, 43 and 44 so that the three signals differ from one another in phase by 120 electrical degrees. These three signals are added in additive network 45, the output of which is a voltage having a fundamental component differing in phase from the original signal by an amount equal to the angular displacement of the synchro transmitter shaft from synchro zero. These operations may be represented by the equation:

$$\sum_{n=0}^{n=2} E_m \cos\left(\theta + \frac{2n\pi}{3}\right) \cos\left(wt + \frac{2n\pi}{3}\right) = \frac{3}{2} E_m \cos\left(wt - \theta\right)$$

where $E_m$=maximum amplitude of the voltage upon the synchro transmitter rotor, $\theta$=angular displacement of the synchro transmitter rotor from synchro zero, and $w = 2\pi$ times the frequency of the voltage applied to synchro transmitter rotor.

The output voltage from the additive network 45 is amplified by phase inverter 46 and then impressed upon a square wave generator 47 in which the sinusoidal signal is further amplified and limited to provide a square wave shape to be applied to a coil of the magnetic recording head 13.

Referring now to Fig. 4 which shows the synchro converter in detail, three input transformers 48, 49 and 50 serve to convert the input from a delta type connection to a star type connection suitable for energizing conventional three terminal electronic networks. Each of these input transformers is connected to a phase-shifting network. In the first network, the phase may be referred to as zero, and the components are voltage-dividing resistors 51 and 52 and pentode 53 with its associated components including cathode bias resistor 54, plate load resistor 55, high frequency by-pass condenser 56 and coupling capacitor 57. Capacitor 56 serves to bypass the plate load resistor 55 at frequencies higher than the signal frequency. This capacitor is necessary to minimize the effect of the third harmonic present in the signal from the synchro transmitter. The output of this stage is fed into the additive network 45.

The purpose of the second phase shifter 43 is to provide a signal whose phase will differ from the output of the first phase shifter by 120 degrees. The secondary winding of input transformer 49 is connected to the voltage divider consisting of resistors 58 and 59 in such a manner that the signal impressed upon the grid of triode 60 is in phase with the corresponding signal from the secondary of transformer 48. Triode 60 is connected as a cathode follower. Resistor 61 is the cathode load resistor, and the plate of the triode is connected to the high side of the regulated voltage supply 62. The signal across resistor 61 is impressed across a phase-shifting network consisting of resistor 63, capacitor 64 and potentiometer 65 which is used to adjust the phase shift to the desired value. Capacitor 66 is a coupling capacitor. Resistor 67 is the grid return resistor, and in parallel therewith is a condenser 68 whose purpose is to eliminate the phase shift which might otherwise occur as a result of the combination of capacitor 66 and resistor 67. Triode 69 is connected as an amplifier, with cathode bias resistor 70, plate load resistor 71, coupling capacitor 72 and resistor 73 which is the grid resistor for the following pentode 74. The voltage appearing at the grid of triode 69, which lags the voltage impressed upon the phase-shifting network by 60 degrees, is further shifted 180 degrees by amplifier triode 69. Thus, the voltage appearing at the control grid of pentode 74 leads the voltage impressed upon the secondary winding of transformer 48 and the voltage appearing at the control grid of pentode 53 by 120 degrees.

The voltage appearing across the voltage divider consisting of resistors 75 and 76 is 180 degrees out of phase with the voltage appearing across the voltage divider 51, 52 and the voltage appearing across the voltage divider 58, 59. The voltage across resistor 76 is impressed upon the control grid of triode 77 which is connected as a cathode follower, resistor 78 being the cathode load resistor. The voltage appearing across the latter resistor is fed into a phase-shifting network consisting of resistor 79, capacitors 80 and 81, and potentiometer 82 which is also used to adjust the phase shift to the proper value. Capacitor 83 is a coupling capacitor and resistor 84 is the grid return resistor for triode 85. The voltage appearing at the control grid of triode 85 will lag the voltage across cathode bias resistor 79 by 120 degrees. This lag of 120 degrees when combined with the 180 degree phase shift obtained through the proper connection of the secondary winding of input transformer 50 will result in the voltage at the control grid of triode 85 leading the voltage impressed upon transformer 48 by 60 degrees. Triode 85 is connected as an amplifier in a manner similar to triode 68, utilizing cathode bias resistor 86, plate load resistor 87, coupling capacitor 88, and grid resistor 89 for pentode 90. The phase of the voltage impressed upon the control grid of triode 85 is further shifted 180 degrees by this amplifier triode. Thus, the voltage appearing at the control grid of pentode 90 leads the voltage appearing at the control grid of pentode 53 by 120 degrees.

Pentodes 74 and 90 are connected in a manner similar to pentode 53. Thus, pentode 74 has associated with it a cathode bias resistor 91, a plate load resistor 92, a high frequency bypass capacitor 93 and a coupling capacitor 94. Similarly, pentode 90 has associated with it a cathode bias resistor 95, a plate load resistor 96, a high frequency bypass capacitor 97 and a coupling capacitor 98.

The signal appearing at the plate of pentode 53 is impressed across resistor 99, potentiometer 100 and mixing resistor 101 through the coupling capacitor 57. In similar manner, the signal appearing at plate of pentode 74 is impressed across resistor 102, potentiometer 103 and the mixing resistor 101 through the coupling capacitor 94; and the signal appearing at the plate of pentode 90 is impressed across resistor 104, potentiometer 105 and the mixing resistor 101 through the coupling capacitor 98. Potentiometers 100, 103 and 105 are used to adjust the maximum amplitudes of the three signals to the same value. Resistors 99 and 101, resistors 102 and 101, and resistors 104 and 101 form voltage-dividing networks for the outputs of pentodes 53, 74 and 90, respectively. Resistor 101 is the common mixing resistor wherein the three separate phase voltages are combined to give a single voltage of constant amplitude whose changing phase reflects the change in position of the rotor 106 of the synchro transmitter 1. Capacitor 107 is a bypass capacitor to minimize the effects of harmonics of the signal frequency.

The sinusoidal voltage of varying phase obtained across the mixing resistor 101 is fed through coupling capacitor 108 to the phase inverter 46 which yields two signals, one differing in phase from the other by 180 degrees. This result is achieved by connecting two triodes 109 and 110 with their associated components as shown. Triode 109 is connected to grid resistor 111 and plate load resistor 112, while triode 110 is connected to grid resistor 113 and plate load resistor 114. The cathodes of triodes 109 and 110 are connected together and to a common cathode bias resistor 115. The lower end of cathode bias resistor 115 is connected to a common cathode load resistor 116. The grid resistors 111 and 113 are connected to the junction point of resistors 115 and 116. The control grid of triode 110 is tied to the lower side of regulated voltage supply 62 through capacitor 117. Thus, when a signal is impressed across grid resistor 111 and cathode load resistor 116, and the voltage in the control grid of triode 109 increases, the plate current flowing through this triode will increase and the voltage drop across cathode bias resistor 115 and cathode load resistor 116 will increase. As capacitor 117 will tend to maintain the grid voltage of triode 110 at a constant voltage, the effect of driving the cathode positive will be to cause the plate current through triode 110 to decrease. Thus, the voltage appearing at the plate of triode 110 will be 180 degrees out of phase with the voltage from the plate of triode 109. The amplitude of the output signal from triode 110 will be somewhat smaller than the output of triode 109.

The output voltages of the phase inverter triodes 109 and 110 are impressed upon two amplifier triodes 118 and 119 through coupling capacitors 120 and 121, respectively. The control grids of triodes 118 and 119 are returned to the low side of the regulated voltage supply 62 through grid resistors 122 and 123. The plates of these triodes are connected to the high side of the regulated voltage supply 62 through plate load resistors 124 and 125. The cathodes of these triodes are connected together and to a common cathode bias resistor 126. This amplifier circuit, in addition to amplifying the signal voltages from the triodes 109 and 110, tends to equalize the amplitudes of the two signals. When the signal from inverter triode 109 is equal in amplitude to the signal from inverter triode 110, the current through the common cathode bias resistor 126 will remain constant, for as one signal becomes more positive the other signal becomes more negative by an equal amount, and the increase in current through one amplifier triode is balanced by a corresponding decrease in the current through the other amplifier triode. When, however, the amplitude of the signal from inverter triode 109 exceeds the amplitude of the signal from inverter 110, there will be a tendency for the current through the common cathode bias resistor 126 to change. Thus, when the signal applied to the control grid of amplifier triode 118 increases more rapidly than the signal applied to the control grid of amplifier triode 119 decreases, there will be an increase in the current through the common cathode bias resistor 126. This increased cathode current will increase the voltage across the common cathode bias resistor 126, and this in effect will lower the potential of the grid with respect to the cathode of amplifier triode 119, thus resulting in a lower plate current through triode 119 and effecting an equalization of the amplitudes of the outputs of the two triodes 118 and 119.

The outputs of the amplifier triodes 118 and 119 pass through coupling capacitors 127 and 128, and are impressed upon power amplifier pentodes 129 and 130 of the square wave generator 47. Resistors 131 and 132 are grid return resistors, and resistors 133 and 134 are grid current limiting resistors. Potentiometer 135 is used to adjust the voltage supplied to the screen grids of pentodes 129 and 130, so that the outputs therefrom may be balanced.

Pentodes 129 and 130 are coupled through output transformer 136 to the appropriate coil of the magnetic head 13. Inasmuch as the plate current of the output pentodes is a function of the signal voltage, the output voltage is a function of the load impedance, and at high frequencies the output voltage would be excessive due to the inductive nature of the load were it not for capacitor 137 which is of relatively small capacity but sufficient to reduce the load impedance to a value which will prevent the generation of voltages that would be injurious to the power amplifier pentodes 129 and 130. It will be noted that there is no cathode bias resistor provided for the power amplifier pentodes 129 and 130, and this lack of bias in conjunction with the relatively large amplitude signal impressed upon the control grids yields a square wave output. It will be noted also that the D.C. plate voltage for the pentodes 129 and 130 is supplied from an unregulated source 138. Thus, the generated square wave signal, which varies in phase according to the position of the rotor 106 of synchro transmitter 1, is supplied to the recording head 13 for recording on the magnetic tape 14.

The synchro converters 9 and 10 of Fig. 1 function in the same manner as does the above described synchro converter 8, to provide square wave signals of varying phase according to the positions of the rotors of synchro transmitters 2 and 3, the square wave signals being supplied to the magnetic recording head 13.

*The programmer*

The programmer 31 of Fig. 1 is shown in detail in Fig. 5. The purpose of this device is to enable the recording of an audio signal on the magnetic tape 14. As shown in Fig. 5, there are two handsets 139 and 140 so connected that the audio signal to be recorded may be obtained either from a local station or from a position some distance from the apparatus. Appropriate programming tones, as well as voice, may be recorded.

Switch 142 energizes the transmitters 141 and 149 of handsets 139 and 140, respectively, by completing one circuit through transformers 144 and 150 to the battery 143. The secondary windings of transformers 144 and 150 are connected directly to the receivers 145 and 151 of the handsets 140 and 139, respectively. Thus, when switch 142 is closed two-way voice communication exists between the two handsets. The secondary windings of transformers 144 and 150 are also connected to the fixed contacts of a double throw switch 146, so that the voltage induced in the secondary windings of either transformer may be selected by switch 146 and impressed across volume control potentiometer 147 and thence to the first stage of voltage amplifier 148.

The audio signal from the effective handset is impressed upon the two stage voltage amplifier 148 which comprises triodes 152 and 153 and associated circuitry of conventional design. The level of the signal impressed upon the control grid of triode 152 is adjusted by placing the movable arm of potentiometer 147 in the correct position. Triode 152 has associated with it a cathode bias resistor 154, by-pass capacitor 155, plate load resistor 156, and coupling capacitor 157. Triode 153 has associated with it a grid resistor 158, cathode bias resistor 159, by-pass capacitor 160, plate load resistor 161 and coupling capacitor 162. The plates of the two triodes are connected to the regulated plate supply 62.

The signal from the voltage amplifier 148 is supplied through coupling capacitor 162 to a phase inverter and power amplifier 163 comprising triodes 164 and 165 and the associated circuit elements. Resistor 166 is the common cathode bias resistor for the two triodes whose grid return resistors are 167 and 168. The signal appearing at the plate of triode 164 is impressed across a voltage divider consisting of resistors 168 and 169, and a portion of this signal is impressed upon the control grid of triode 165. The phase of this signal will have been shifted 180 degrees through the action of triode 164 from the signal appearing at the control grid of that triode. Thus, the outputs of triodes 164 and 165 appearing across the two halves of the primary winding of transformer 170 will be 180 degrees out of phase with respect to the transformer center tap. Capacitor 171 serves to keep the D.C. plate voltage from being impressed upon the control grid of triode 165. The secondary winding of the output transformer 170 is connected to an appropriate coil of the magnetic recording head 13, and thus audio signals are recorded upon the magnetic tape 14.

The programmer 31 also includes facilities for impressing a marker-tone of constant frequency upon magnetic recording head 13. The marker-tone oscillator 172 consists of triodes 173 and 174 and their associated circuit components. Triode 173 has its cathode connected through bias resistor 175 to ground. The plate of this triode is connected to the plate supply through plate load resistor 176, and is also connected through coupling capacitor 177 to a voltage divider consisting of resistors 178 and 179. The junction of these resistors is connected to the control grid of triode 174. The cathode of this triode is connected to cathode bias resistor 180 and thence through switch 181, located in remote handset 140, to the low or ground side of the regulated voltage supply 62. The plate of triode 174 is connected to the plate supply through plate load resistor 182, and is also connected to the grid of triode 173 through resistor 183 and capacitor 184. The grid of triode 173 is connected to the low side of the plate supply through resistor 185 which is shunted by capacitor 186. Resistor 183, capacitor 184, and the impedance resulting from the parallel combination of resistor 185 and capacitor 186, form a voltage divider. At frequencies lower than the desired frequency, the voltage on the control grid of triode 173 will be small, since the size of resistor 185 will be small compared with the sum of the resistance of resistor 183 and the reactance of capacitor 184. At frequencies higher than the desired frequency, the impedance of capacitor 186 will be small compared to the sum of the resistance of resistor 183 and the reactance of capacitor 184. Thus, this selective network of resistors 183 and 185, and capacitors 184 and 186 favors the desired frequency and rejects or minimizes the effect of frequencies higher or lower than the desired frequency. The output of the marker-tone oscillator 172 is taken from the cathode of triode 174, and is impressed through coupling capacitor 187 upon the control grid of amplifier triode 153, i.e. the second stage of the voltage amplifier 148. The marker-tone oscillator is keyed by the closing of switch 181 which completes the cathode circuit of triode 174.

It will be apparent that other marker-tone oscillators of different frequencies could be provided and could be keyed by switches arranged to be closed in any desired manner.

The level of the voltage impressed upon the magnetic recording head 13 from the programmer 31 is preferably measured by a recording level indicator 188 which is a voltmeter connected in parallel with the secondary winding of the output transformer 170.

*The magnetic recorder*

Referring again to Fig. 1, the outputs of the reference square wave generator 12, synchro converters 8, 9 and 10, and programmer 31 are impressed upon different windings of the magnetic recording head 13 which requires no detailed illustration or description since multi-winding magnetic recorders are well known. The magnetizing windings of the recording head are so physically arranged that the signals will be impressed upon different channels or tracks of the magnetic recording medium or tape 14 which passes over the recording head. Inasmuch as the signals from the reference square wave generator 12 and the synchro converters 8, 9 and 10 are square waves sufficiently large to saturate the effected areas of the magnetic medium, the signals which appear on the recording medium 14 will be of rapidly varying polarity. The magnetic recording medium is driven at a constant speed by suitable drive means (not shown).

*The magnetic reproducer*

Turning now to the reproducing system shown in Fig. 2 and hereinbefore generally described, the magnetic recording medium 14 passes over the magnetic head 189 in the reproducer, the purpose of which is to pick up the signals from the recording medium 14 and raise the amplitudes of those signals to voltages sufficiently high to drive the reference monitor 15, channel monitors 17, 18 and 19, and audio monitor 32. The principal components of the magnetic reproducer are the magnetic head 189 and five preamplifiers 190, 191, 192, 193 and 194. The reproducing head 189 is similar in construction to the recording head 13. The several coils of the head 189 are so arranged as to pick up the signals from the several parallel tracks which have been created by the recording head. The signal from the programmer 31 is picked up by a coil of head 189 and is impressed upon pre-amplifier 190, from which it is supplied to the audio monitor 32. The signal from the reference square wave generator 12 is picked up by another coil of head 189 and is impressed upon pre-amplifier 191 from which it is fed to the reference monitor 15. The signals from the several synchro converters 8, 9 and 10 are picked up by other coils of head 189 and are impressed upon pre-amplifiers 192, 193 and 194, from which they are supplied to the channel monitors 17, 18 and 19, respectively. Because of the nature of magnetic recordings, the voltages induced in the coils of the magnetic head 189 will not be square waves but will be derivatives of square waves, that is, pulses.

The pre-amplifiers are similar, and a description of one of them will suffice. Fig. 6 shows one of the pre-amplifiers in detail. Referring to that figure, the pre-amplifier is a three-stage amplifier including triodes 195 and 196, and an invertor output stage including triodes 197 and 198. The associated pickup coil of the reproducer head 189 is connected to the control grid of triode 195 with which there are associated a resistor 199 which provides bias and feedback voltages, a plate load resistor 200 and coupling capacitor 201. The output of triode 195 is impressed upon the grid resistor 202 of triode 196. The latter triode has associated with it a cathode bias resistor 203, plate load resistor 204 and coupling capacitor 205. The output of this triode is impressed upon the control grid of triode 197. Associated with triode 197 are plate load resistor 206 and grid-return resistor 207, and similarly associated with triode 198 are plate resistor 208 and grid-return resistor 209. The cathodes of triodes 197 and 198 are connected together and to a common cathode bias resistor 210 which, in turn, is connected to a cathode load resistor 211 which is connected to the low side of the regulated plate voltage supply 212. The grid of triode 198 is connected to the low side of the plate voltage supply through capacitor 213. The output of this invertor circuit is obtained through coupling capacitors 214 and 215. The operation of this circuit is similar to the operation of the invertor circuit 46 of Fig. 4 previously described. Capacitors 216 and 217 which are connected to the plates of triodes 197 and 198 respectively serve to bypass certain high frequency components in the signal which are undesirable. Resistor 218 and capacitor 219 form a de-coupling network for triodes 195 and 196. It will be noted that the plate of triode 198 is connected to the cathode of triode 195 through a feedback resistor 220. This feedback resistor 199 of triode 195 constitute a voltage divider network, and the signal impressed upon cathode resistor 199 as a result of this feedback loop serves to reduce the gain of the circuit and improve its stability.

The reference monitor

Referring again to Fig. 2, the purpose of the reference monitor 15 is to convert the pulse signal obtained from preamplifier 191 into a square wave of constant amplitude and varying phase suitable for driving the reference generator 16, and to obtain two sinusoidal voltages separated in phase by 90 degrees suitable for providing a rotating sweep for the individual cathode ray tubes of each of the channel monitors 17, 18 and 19.

The reference monitor is shown in block form in Fig. 2 and is shown in detail in Fig. 7. The output of the pre-amplifier 191 is impressed upon a cathode follower stage 221 comprising triodes 222 and 223 and the associated circuit elements. Associated with the triode 222 are the grid resistor 224, cathode bias resistor 225, cathode load resistor 226 and coupling capacitor 227. Associated with the triode 223 are the grid resistor 228, cathode bias resistor 229, cathode load resistor 230, and coupling capacitor 231. The plates of triodes 222 and 223 are connected directly to the regulated plate voltage supply 212.

The cathode follower stage 221 leads into the limiter stage 232 which comprises pentodes 233 and 234 and their associated circuit elements. The output of cathode follower triode 222 is impressed upon the grid-return resistor 235 of limiter pentode 233. The control grid of this pentode is connected to its grid-return resistor through grid current limiting resistor 236. The plate of the same pentode is connected to the high side of the regulated plate voltage supply 212 through plate load resistor 237 and is connected to the low side of said supply through capacitor 238, whose purpose is to bypass undesirable high frequency components in the signal. The screen of the same pentode is connected to the high side of said supply through screen dropping resistor 239, and to the low side of said supply through decoupling capacitor 240. The other limiter pentode 234 is similarly connected, being connected to plate load resistor 241, bypass capacitor 242, grid current limiting resistor 243, grid return resistor 244, screen voltage dropping resistor 239, and screen decoupling capacitor 240. The cathodes of limiter pentodes 233 and 234 are connected directly to the low side of the regulated voltage supply 212.

The voltages appearing at the plates of the limiter pentodes are impressed upon a discriminator 245 comprising pentodes 246 and 247. Pentode 246 is connected to grid return resistor 248, plate load resistor 249 and coupling capacitor 205. In similar manner pentode 247 is connected to grid return resistor 251, plate load resistor 252 and coupling capacitor 253. The cathodes of the discriminator pentodes 246 and 247 are connected together and to the junction of cathode bias resistor 254 and voltage dropping resistor 255. Capacitor 256 is a cathode bypass capacitor. The screen grids of the discriminator pentodes are connected together and to the high voltage supply through voltage dropping resistor 257. A fixed bias upon the discriminator pentodes is attained through the use of a voltage divider consisting of resistors 257, 255 and 254 which are connected across the regulated voltage supply 212. Capacitor 258 with capacitor 256 provides the decoupling capacity for the screen grids of the discriminator pentodes.

The outputs of the discriminator pentodes are impressed upon a square wave generator 259 comprising triodes 260 and 261. Resistors 262 and 263 are grid return resistors. The plate of triode 260 is connected to plate load resistor 264, while the plate of triode 261 is connected to plate load resistor 265. The plate of triode 260 is connected to the grid of triode 261 through resistor 266, while the plate of triode 261 is connected to the grid of triode 260 through resistor 267. The cathodes of the two triodes are connected together and to a common cathode bias resistor 268. Triode 260 is decoupled through the use of a network consisting of resistor 269 and capacitor 270. Similarly, triode 261 is decoupled through the use of resistor 271 and capacitor 272. The output of the square wave generator is obtained from the plate of triode 261 through coupling capacitor 273.

Thus, when a series of pulses, of alternating positive and negative polarity, are impressed upon the control grid of cathode follower triode 222, a similar series of pulses will appear across cathode resistors 225 and 226 and across the grid return resistor 235 of limiter pentode 233. Since the cathode of pentode 233 is connected directly to the low side of the voltage supply 212, there is no bias upon this tube and when a positive impulse is impressed across its grid return resistor 235, the control grid of this pentode will draw current and there will be a voltage across the grid current limiting resistor 236 which will tend to equal the positive voltage across the grid return resistor 235. The negative pulses impressed upon the control grid of pentode 233 will appear as positive pulses across plate load resistor 237. The amplitudes of the input pulses are such that the tube will be cut off before the peak voltage of each negative pulse is reached, so that the output of limiter pentode 233 will be a series of positive pulses of approximately uniform size. This signal is impressed upon the control grid of discriminator pentode 246. The latter has fixed cathode bias resulting from the operation of the voltage divider network consisting of resistors 257, 255 and 254, resistor 254 being the cathode bias resistor for this discriminator pentode. Because of this fixed bias, there will be an output pulse across plate load resistor 249 only when the positive pulses impressed upon the control grid are of sufficient amplitude to overcome the fixed bias. In this manner, discriminator pentode 246 passes only the desired signal pulses, rejecting those voltages resulting from noise, erasure of previous signals, etc. The output signal appearing across plate load resistor 249 will be a series of negative pulses of uniform amplitude, one for each complete cycle of square wave impressed upon the magnetic recording medium.

Cathode follower triode 223, limiter pentode 234 and discriminator pentode 247 operate in the same manner as described above. However, since the series of pulses impressed upon the grid of cathode follower triode 223 is 180 degrees out of phase with the series of pulses impressed upon the control grid of cathode follower 222, the output across plate load resistor 252 of discriminator pentode 247 will be a series of negative pulses of uniform amplitude but differing in phase with the signal appearing across plate load resistor 249 by 180 degrees.

Triodes 260 and 261 are connected in a flip-flop arrangement, so that when the plate voltage from the unregulated high voltage supply 274 is applied, either one or the other will conduct but both tubes will not be in a conductive state at the same time. Assuming that triode 260 is conducting and that triode 261 is in a non-conducting state, there will be no voltage drop through resistors 265 and 271, and the positive plate voltage from the unregulated high voltage supply 274 will be impressed upon the control grid of triode 260, thus encouraging the flow of current through this triode. Inasmuch as the two triodes have a common cathode bias resistor 268, the current flowing through triode 260 will apply a bias voltage to triode 261, while the current flowing through plate load resistor 264 will lower the voltage appearing at the plate of triode 260 and the control grid of triode 261 below that required to overcome the bias and thus triode 261 will be held in a non-conducting state. When a negative pulse appearing across plate load resistor 249 is impressed across grid return resistor 262, triode 260 will be cut off and the positive voltage appearing at its plate will rise as will the voltage appearing at the control grid of triode 261, and the biasing voltage across cathode bias 268 will decrease until finally triode 261 will begin to conduct. By the time that the negative pulse impressed upon the control grid of triode 260 has subsided, the bias voltage across resistor 268 will have increased while the voltage at the plate of triode 261 and the voltage appearing on the grid of triode 260 will have decreased to such levels that the triode 260 will be held in a non-conducting state until the flow of current through triode 261 is cut off by the next negative pulse appearing across plate load resistor 252. In this manner, triode 261 is alternately conducting and non-conducting, and the voltage appearing across plate load resistor 265 is of square wave shape.

The output of the square wave generator triode 261 is impressed through coupling capacitor 273 upon a voltage divider consisting of resistors 275 and 276. The voltage appearing across resistor 276 is fed through capacitor 277 into a filter circuit 278 which is of the voltage feedback type. This filter circuit comprises triodes 279 and 280, pentode 281, and a parallel T filter network consisting of resistors 282, 283, 284 and 285 and capacitors 286, 287 and 288. Triode 280 is connected to grid return resistor 289, cathode bias resistor 290, cathode load resistor 291, plate load resistor 292 and coupling capacitor 293. Pentode 281 is connected to cathode bias resistor 294, cathode bias capacitor 295, grid return resistor 296, plate load resistor 297, coupling capacitor 298, screen grid voltage dropping resistor 299 and screen decoupling capacitor 300. The plate of pentode 281 is connected through the aforementioned parallel T filter network and D.C. blocking capacitor 301 to the control grid and grid return resistor 302 of triode 279 which is connected as a cathode follower to cathode biasing resistor 290 and cathode load resistor 291. The components of the parallel T network are so chosen as to partially attenuate a signal of desired frequency, permitting frequencies of either higher or lower value to pass without such marked attenuation. Resistor 285 is a bridging resistor to reduce the sharpness of the network.

Thus when the square wave signal from square wave generator 259 is impressed upon the grid of triode 280, a voltage of similar wave shape but differing in phase from the signal voltage by 180 degrees will appear across plate load resistor 292. This signal will in turn be amplified and inverted by pentode 281 so that the signal voltage appearing across plate load resistor 297 will be in phase with the voltage applied to the grid of triode 280. The signal appearing across resistor 297 is fed through the parallel T network and back to the control grid of cathode follower triode 279. The square wave signal fed into the filter network may be considered to consist essentially of the fundamental and odd harmonics. The parallel T is tuned to reject the fundamental frequency component of the square wave input; therefore the signal of that frequency appearing at the grid of cathode follower triode 279 will be very small compared with the signals of the higher frequency components of the square wave. Thus the current flowing through cathode bias resistor 290 and cathode load resistor 291 due to the action of triode 279 will have a small component of the fundamental frequency of the square wave compared with the current due to the higher harmonics of that signal. Therefore the fundamental frequency component of the square wave will be relatively unaffected by the feed back voltage through the parallel T while the components of higher frequencies will cause voltages to appear across cathode bias resistor 290 and cathode load resistor 291 which are substantially in phase with the harmonic components of the square wave input impressed upon the control grid of triode 280. As a result of these in-phase voltages caused by the current through triode 279, an increase in the voltage on the grid of triode 280 will be countered by a similar increase in the voltage appearing across cathode bias resistor 290 and cathode load resistor 291, thereby minimizing the effect of the harmonics included in the square wave input. In this manner the square wave input to the filter is changed into a sinusoidal output of a frequency equal to the fundamental component of the square wave input, said sinusoidal ouput voltage appearing across plate load resistor 297 of pentode 281.

Triodes 303 and 304 and their associated components constitute 90 degree phase shifter 305, the purpose of which is to convert the single sinusoidal input voltage from the filter 278 into two sinusoidal voltage outputs each differing from the other in phase by 90 degrees. Through coupling capacitor 298, the output of filter pentode 281 is impressed across a phase shifting network consisting of resistors 307 and 308 and capacitor 309. The input to triode 304 is taken between the junction of resistors 307 and 308 through coupling capacitor 310 and the cathode of triode 303. The input of triode 303 is obtained from the junction of resistor 308 and capacitor 309 and the low side of regulated power supply 212. Triode 303 operates as a cathode follower. The output voltage developed across plate load resistor 311 of triode 304 and appearing at the plate thereof is a function of (a) the signal voltage from the phase shifting network which has been impressed across grid resistor 312 and common cathode load resistor 313, (b) the difference in grid-cathode voltage resulting from the flow of current from triode 303 through common cathode bias resistor 314 and (c) the change in voltage across common cathode load resistor 313 due to the current from triode 303. The output voltage appearing at the junction of the cathodes of triodes 303 and 304 is the result of the voltages developed across common cathode bias resistor 314 and common cathode load resistor 313 by the respective currents from triodes 303 and 304. The relative sizes of the aforementioned components and characteristics of the two triodes are so chosen that a phase difference of 90 degrees between the two output voltages is obtained while the amplitudes of the two voltages are substantially the same.

The output of the phase shifter 305 is supplied to amplifiers 315 and 316 comprising triodes 317 and 318 and their associated components connected as conventional Class "A" voltage amplifiers. The purpose of these two amplifiers is to raise the amplitude of the phase shifter output to a level suitable for use as sweep voltages on individual cathode ray tubes of channel monitors 17, 18 and 19 hereinafter described. Triode 317 is connected to grid return resistor 319, cathode bias resistor 320, plate load resistor 321 and coupling capacitor 322. Triode 318 is connected to grid return resistor 323, cathode bias resistor 324, plate load resistor 325, and coupling capacitor 326.

*The reference generator*

The reference generator 16 is shown in detail in Fig. 8 presently to be referred to.

The function of the reference generator is to convert the single sinusoidal voltage input from the reference monitor 15 into three sinusoidal output voltages each differing in phase from the other by 120 degrees. Referring first to Fig. 2, this objective is accomplished in the following manner:

The input from the reference monitor is impressed upon a filter 327 whose output is impressed upon a cathode follower 328 which drives three phase shifting circuits 329, 330 and 331. The phase shifting circuits provide the three voltages each differing from the other by 120 degrees which are fed into cathode followers 332, 333 and 334. The outputs of the reference generator, obtained from the three cathode followers are utilized in the synchro duplicators 23, 24 and 25 hereinafter described.

Reference is now made to Fig. 8 for detailed description of the reference generator 16. The output of the reference monitor 15 is fed through coupling capacitor 335 to the control grid of a cathode follower triode 336. Triode 336 is connected to grid return resistor 337, cathode bias resistor 338 and cathode load resistor 339. The output at the cathode is taken across a voltage divider consisting of resistors 340 and 341. This voltage divider is necessary to provide a signal of the level desired to drive the filter circuit on the low side of coupling capacitor 342. This filter circuit, which comprises triodes 343 and 344 and pentode 345 with their associated components, is identical in construction and operation with the filter circuit 278 in reference monitor 15 described above.

The output of filter 327 drives triode 346 which is connected as a cathode follower to grid return resistor 347, cathode bias resistor 348, and cathode load resistor 349. The output of this cathode follower is used to drive phase shifters 329, 330 and 331, now to be described.

Phase shifter (0 degrees) 329 consists of a pentode amplifier 350 which is connected in the following manner. The output of cathode follower triode 346 is fed through coupling capacitor 351 to potentiometer 352 which serves as the grid return path for the control grid of pentode 350, the movable arm of potentiometer 352 being connected to the control grid. Resistor 353 is the plate load resistor; resistor 354 is the cathode bias resistor; resistor 355 is the screen voltage dropping resistor; and capacitor 356 is the screen decoupling capacitor. Potentiometer 352 may be adjusted to obtain an output of the desired amplitude through coupling capacitor 357.

Phase shifter (120 degrees) 330 consists of a phase shifting network, potentiometer 358 and capacitor 359, a pentode 360 which is connected as a triode amplifier, and pentode amplifier 361 with their respective components. Pentode 360 has its plate, suppressor and screen grids tied together; resistor 362 is the plate load resistor; capacitor 363 is the coupling capacitor; resistor 364 is the cathode bias resistor; and the grid return path for the control grid is potentiometer 365 which is used to adjust the amplitude of the output of phase shifter 330. Pentode 361 is connected to grid return resistor 366, cathode bias resistor 367, plate load resistor 368, coupling capacitor 369, screen voltage dropping resistor 370 and screen decoupling capacitor 371. Phase shifting potentiometer 358 and capacitor 359 are so chosen that the movable arm of the potentiometer may be adjusted to cause the voltage appearing across capacitor 359 to lag the output voltage of cathode follower triode 346 by 60 degrees. When this phase lag of 60 degrees is combined with the 180 degrees phase shift through amplifier 360, it can be readily seen that the voltage appearing at the control grid of pentode amplifier 361 will lead the voltage appearing at the control grid of pentode amplifier 350 in phase shifter 329 by 120 degrees.

Phase shifter (240 degrees) 331 consists of a phase shifting network and a pentode amplifier 372. The output of cathode follower triode 346 is impressed upon the phase shifting network which includes resistor 373, capacitor 374, potentiometer 375, and capacitor 376. The voltage appearing across capacitor 376 is fed through coupling capacitor 377 to potentiometer 378 which provides the grid return path for pentode 372. Pentode 372 is connected in a manner similar to pentodes 350 and 361, resistor 379 being the plate load resistor, capacitor 380 being the coupling capacitor, resistor 381 being the cathode bias resistor, resistor 382 being the screen voltage dropping resistor, and capacitor 383 being the screen grid decoupling capacitor. The voltage appearing across capacitor 374 of the phase shifting network lags the output voltage of the cathode follower triode 346 by approximately 60 degrees. This voltage appearing across capacitor 374 is shifted an additional 60 degrees by the operation of the second section of the phase shifting network, potentiometer 375 and capacitor 376, so that the voltage appearing across the capacitor 376 will lag the output of cathode follower triode 346 and the input to pentode 350 in phase shifter 329 by 120 degrees or lead it by 240 degrees. Potentiometer 375 may be adjusted to obtain the exact phase shift desired, while the amplitude of the output of phase shifter 331 is controlled by the setting of potentiometer 378.

Since each of the pentode amplifiers 350, 361 and 372 in phase shifters 329, 330 and 331, respectively, performs identical functions, it can be seen that the outputs of the three phase shifters will have equal amplitudes but will differ in phase one from the other by 120 degrees.

Cathode followers 332, 333 and 334 are identical and are designed to provide sufficient power for the gate circuits of the synchro duplicators 23, 24 and 25. Cathode follower 332 comprises a pentode 384 and associated elements including grid return resistor 385, cathode bias resistor 386 and cathode load resistor 387. The screen grid and plate of pentode 384 are connected directly to the unregulated high voltage supply 274. The output is taken from the cathode through coupling capacitor 388. Pentode 389 and 390 are connected in a similar manner and deliver signals via coupling capacitors 391 and 392.

*The channel monitors*

Referring again to Fig. 2, each channel signal from magnetic tape 14 is treated in the following manner: The output of preamplifier 192, for example, is a series of pulses, alternately positive and negative, which correspond to the reversal of polarity in the square wave which was the output of synchro convertor 8. These pulses are impressed upon channel monitor 17 (Figs. 2 and 9) whose function is to change this series of pulses into a square wave similar to the square wave output of synchro convertor 8 which was impressed upon a magnetizing coil of magnetic recording head 13. This is accomplished through the use of cathode follower 393, limiter 394, discriminator 395, and square wave generator 396. These circuits are identical in construction and operation to the corresponding circuits in the reference monitor 15 described above. Two square wave outputs, one differing from the other by 180 degrees, are obtained between the low sides of coupling capacitors 397 and 398 and the low side of the unregulated high voltage supply 274 and are supplied to the synchroduplicator 23 hereinafter desicribed.

Another function of the reference monitor 15 and the channel monitor 17 is to provide a system for visually checking the efficacy of the recording or reproducing operations. This is accomplished in the manner heretofore described, namely, a circular sweep is provided for a cathode ray tube 399 from a circuit in the reference monitor 15. This sweep voltage will depend upon the presence of the proper reference voltage. The signal voltage is impressed upon the cathode ray tube 399 through limiter 400 and will appear as a dot on the screen when the proper signals have been received. Thus the operator of the device may tell at a glance whether or not the equipment is functioning properly.

Referring more particularly now to Fig. 9, it will be seen that the pulse signal is impressed upon the control grid of the cathode ray tube 399 in the following manner:

the pulse signal appearing at the cathode of cathode follower triode 401 is fed through coupling capacitor 402 and grid current limiting resistor 403 to the control grid of limiter pentode 404. Limiter pentode 404 is connected to grid return resistor 405, plate load resistor 406, coupling capacitor 407, screen dropping resistor 408 and screen decoupling capacitor 409. The cathode is connected directly to the low side of the high voltage supply 274. The output voltage from limiter pentode 404 is impressed upon the control grid of the cathode ray tube 399 across grid resistor 410. The accelerating potential is impressed upon grid number two and anode number two of the cathode ray tube 399 from the unregulated high voltage supply 274. The focusing voltage is supplied from the movable arm of potentiometer 411 which is in series with resistor 412; potentiometer 411 and resistor 412 being a voltage divider across the regulated supply 212. One side of the deflecting electrodes are tied together through capacitor 413 and thence to the low side of the regulated voltage supply 212 through capacitor 414. The centering voltages from sources 415 and 416 are applied to the two pairs of deflecting electrodes through identical centering circuits consisting of resistors 417 and 418 and potentiometer 419, and resistors 420 and 421 and potentiometer 422. The two-phase voltage which is supplied by the reference monitor 15 is impressed upon the deflecting electrodes from coupling capacitors 322 and 326 (Fig. 7).

Channel monitors 18 and 19 are identical in purpose, construction and operation with channel monitor 17 which has been described above. Channel monitors 18 and 19 provided the desired square wave signals for synchro duplicators 24 and 25.

The synchro duplicators

The purpose of the synchro duplicator 23 (Figs. 2, 10A and 10B) is to generate three voltages similar to the stator voltages of the synchro transmitter from a signal input of constant maximum amplitude and variable phase from the channel monitor 17 and the three phase reference voltage from the reference generator 16. To duplicate signals received by the signal convertor 8 it is necessary to generate three sinusoidal voltages having the frequency of the voltage impressed upon the synchro receiver 20 and varying in amplitude according to the expressions, $$A \cos \theta$$
$$A \cos \left(\theta + \frac{2\pi}{3}\right)$$
$$A \cos \left(\theta + \frac{4\pi}{3}\right)$$

where $\theta$ is the phase displacement of the signal voltage with respect to the zero phase reference voltage and, therefore, represents the original angular shaft displacement. The instantaneous amplitudes of the three voltages from the reference generator 16 vary according to the expressions, $$A \sin wt$$
$$A \sin \left(wt + \frac{2\pi}{3}\right)$$
$$A \sin \left(wt + \frac{4\pi}{3}\right)$$

and these three voltages are impressed upon the three gating circuits 423, 424 and 425. These gating circuits are simultaneously triggered by the variable phase square wave supplied through cathode follower 426 from the channel monitor 17, thus permitting one-half of each cycle to pass through gates 423, 424 and 425. The portion of each cycle passed will be determined by the phase of the square wave with respect to each of the reference voltages. The outputs of the gates are integrated in integrating circuits 427, 428 and 429 to yield D.C. voltages having amplitudes according to the integral expressions, $$\tfrac{1}{2}\int_\theta^{(\pi+\theta)} A \sin wt\, dwt$$
$$\tfrac{1}{2}\int_\theta^{(\pi+\theta)} A \sin \left(wt+\frac{2\pi}{3}\right) dwt$$
$$\tfrac{1}{2}\int_\theta^{(\pi+\theta)} A \sin \left(wt+\frac{4\pi}{3}\right) dwt$$

The results of the above integrals are D.C. voltages having the same relative amplitudes as the desired synchro output signals. These D.C. voltages are modulated by modulators 430, 431 and 432 so that the outputs will be three square waves of varying amplitudes which are impressed upon filter-amplifiers 433, 434 and 435. The outputs of the filter-amplifiers are sinusoidal wave forms of varying amplitude which simulate the outputs of the stator of the synchro transmitter 1.

Referring more particularly to Figs. 10A and 10B, the sheets containing these figures, when placed side-by-side with Fig. 10A at the left, illustrate completely the synchro duplicator 23. The square wave signal from the channel monitor 17 is impressed upon the grids of cathode follower triodes 436 and 437. Triode 436 is connected to cathode bias resistor 438 and grid return resistor 439, and these resistors are connected together and to the high side of cathode load resistor 440 which is returned to the low side of the regulated supply voltage 212. In a similar manner, triode 437 is connected to cathode bias resistor 441 and grid return resistor 442, and these resistors are connected together and to the high side of cathode load resistor 443 which is returned to the low side of the regulated supply voltage 212. The output of triode 436 is taken from the cathode through coupling capacitor 444 to rectifier 445, and one side of secondary windings 446, 447 and 448 of gate transformers 449, 450 and 451 respectively. The output of triode 437 is taken from the cathode through coupling capacitor 452 to rectifier 453 and one side of secondary windings 454, 455 and 456 of the gate transformers. The three phase voltages from the reference generator 16 are impressed across primary windings 457, 458 and 459 of the gate transformers. Secondary windings 448 and 456 are so connected that the voltages induced in those windings will be in phase when measured to the common point in the duplicator circuit, i.e. the low side of the regulated voltage supply 212. Because of a similar choice of connections in each of the other two gate transformers the voltages induced in the secondary will be in phase with each other. One side of secondary winding 456 is connected to the plate of diode 460, while one side of secondary winding 448 is connected to the cathode of diode 461. The cathode of diode 460 and the plate of diode 461 are connected together and to the diode load resistor 462 which is returned to the low side of the regulated voltage supply 212. In a similar manner, one side of secondary winding 455 is connected to the plate of diode 463, and one side of secondary winding 447 is connected to the cathode of diode 464, while the cathode of diode 463 and the plate of diode 464 are connected together and to diode load resistor 465 which is returned to the low side of the regulated voltage supply 212. Similarly, one side of secondary winding 454 is connected to the plate of diode 466, and one side of secondary winding 446 is connected to the cathode of diode 467, while the cathode of diode 466 and the plate of diode 467 are connected together and to the diode load resistor 468 which is returned to the low side of the regulated voltage supply 212.

Rectifier 445 is connected so that on the negative half cycle of the square wave from cathode follower triode 436, the resistance offered by rectifier 445 to the passage of current will be very small and the voltage from cathode follower triode 436 will be effectively shorted.

In a similar manner, rectifier 453 is connected so that on the positive cycle of the square wave from cathode follower triode 437, the resistance offered by rectifier 453 to the passage of current will be very small and the voltage from cathode follower triode 437 will approach zero.

The amplitude of the square waves from cathode follower triodes 436 and 437 are equal to or larger than the maximum amplitudes of the three reference voltages. Thus during the half cycle that rectifier 445 presents a high resistance, a positive voltage from cathode follower triode 436 equal to or larger than the maximum amplitude of the sinusoidal reference voltages induced in secondary windings 446, 447 and 448 will be impressed upon cathodes of diodes 467, 464, and 461 respectively, effectively preventing the passage of current through those diodes. During the half cycle that rectifier 445 presents a very low resistance, the voltage from cathode follower triode 436 will be shorted and the only voltage appearing at cathodes of diodes 467, 464 and 461 will be the three reference voltages induced in secondary windings 446, 447 and 448 respectively. During the negative half cycle of the sinusoidal reference voltages, currents will flow through diodes 467, 464 and 461 and diode load resistors 468, 465 and 462.

In a similar manner, during the half cycle that rectifier 453 presents a high resistance, a negative voltage from cathode follower triode 437 equal to or larger than the maximum amplitude of the sinusoidal reference voltages induced in secondary windings 454, 455 and 456 will be impressed upon the plates of diodes 466, 463 and 460, respectively, effectively preventing the passage of current through those diodes. During the half cycle that rectifier 453 presents a very low resistance, the voltage from cathode follower triode 437 will be shorted and the only voltage appearing at the plates of diodes 466, 463 and 460 will be the three reference voltages induced in secondary windings 454, 455 and 456, respectively. During the positive half cycle of the sinusoidal reference voltages, currents will flow through diodes 466, 463 and 460 and diode load resistors 468, 465 and 462, respectively. The voltage appearing across diode load resistor 462 will be the sum of the voltages resulting from the current through diode 460 and the current from diode 461. This voltage will appear for alternate half cycles of the given signal frequency and will appear as 180 degrees of sinusoid. The particular portion of the sine wave that appears will depend upon the relative phase between the signal square wave and the reference sinusoid. The foregoing description is similarly applicable to explain the nature of the voltage appearing across the diode load resistor 465 as a result of the currents flowing through diodes 463 and 464 and the voltage appearing across diode load resistor 468 as a result of the currents flowing through diodes 466 and 467.

The simultaneous action of the three gating circuits 423, 424 and 425 for a given condition may be more easily understood by referring to the wave forms of Fig. 12. For the purpose of illustration, it may be assumed that the relative phases of the various voltages are as shown. The voltage output of cathode follower triode 436 appearing across rectifier 445 is shown as wave form A-2 while the voltage output of cathode follower triode 437 appearing across rectifier 453 is shown as wave form A-1. Wave forms B-1, B-2, B-3 represent the three sinusoidal reference voltages induced in the secondary windings of gate transformers 451, 450 and 449, respectively. It should be noted the voltage induced in the secondary windings of transformer 450 leads the voltage induced in the secondary windings of transformer 451 by 120 degrees, while the voltage induced in the secondary windings of transformer 449 leads the voltages induced in the secondary windings of transformer 451 by 240 degrees. The voltage appearing at the cathode of diode 461 is the sum of the voltage across rectifier 445 and secondary winding 448 and is shown as C–2; and in a similar manner the resultant voltages at the cathodes of diodes 464 and 467 are shown by wave forms C–4 and C–6 respectively. The voltage appearing at the plate of diode 460 is the sum of the voltage across rectifier 453 and secondary winding 456 and is shown as C–1; and in a similar manner the resultant voltages at the plates of diodes 463 and 466 are shown by wave forms C–3 and C–5. The currents through diodes 461, 460, 464, 463, 467 and 466 are shown as wave forms D–2, D–1, D–4, D–3, D–6 and D–5. The sum of the currents through and the voltages across diode load resistors 462, 465 and 468 are shown by E–1, E–2 and E–3 respectively.

The output voltages of the gate circuits 423, 424 and 425 are impressed upon integrator circuits 427, 428 and 429, respectively. The purpose of the integrator circuit is to convert the irregularly shaped voltage which is impressed upon it for alternate half cycles into a D.C. voltage which is the average amplitude of that irregular wave shape. This result is accomplished through the use of two identical filter circuits connected in series. Referring to Fig. 10B, the voltage appearing across diode load resistor 462 is impressed across a resistor-capacitor filter circuit consisting of filter resistor 469 and filter capacitor 470. Connected in parallel with the resistor-capacitor filter is an electronic filter which consists of filter triode 471 and its associated components, i.e. cathode bias resistor 472, grid return resistor 473, plate load resistor 474, filter input capacitor 475 and filter output capacitor 476. The electronic filter circuit attenuates the high frequency components of the voltage appearing across filter capacitor 470 in the following manner: As the frequency of the signal appearing across filter capacitor 470 increases, the drop in voltage across filter input capacitor 475 will decrease and the voltage across resistor 473 which is impressed upon the grid of triode 471 will increase. This in turn will result in a large signal appearing at the plate of triode 471. The plate of triode 471 is connected through filter output capacitor 476 to the junction of filter capacitor 470 and filter resistor 469 which is the point from which the input to the electronic filter is taken. Since the output of triode 471 is 180 degrees out of phase with the input voltage, the output of triode 471 tends to nullify the high frequency voltages which appear across filter capacitor 470. As has been stated heretofore this filter stage is followed by a filter identical in design consisting of filter resistor 477, filter capacitor 478, filter triode 479, cathode bias resistor 480, grid return resistor 481, plate load resistor 482, filter input capacitor 483 and filter output capacitor 484. Thus the irregularly shaped input voltage is further smoothed to yield the desired direct current output across output resistor 485. The values of the resistor-capacitor combinations in both the resistor-capacitor networks and in the electronic filter circuits are so chosen to provide an integrator circuit which will permit the relatively low frequency changes in amplitude due to the transmission of intelligence to pass without noticeable attenuation.

The outputs of gating circuits 424 and 425 are impressed upon integrator circuits 428 and 429 which are identical to integrator 427 above described.

The outputs of integrating circuits 427, 428 and 429 are impressed upon modulators 430, 431 and 432. The purpose of each modulator is to convert the direct current output of the preceding integrator into a square wave signal of the same amplitude. Referring to Fig. 10, the input signal to modulator 430 is impressed upon stationary contacts of relay 486, while the output of the modulator is taken from the movable arm of the relay. One stationary contact is connected to the low side of the regulated voltage supply 212. The relay 486 is energized by alternating current voltage from transformer 487 which is connected to the constant amplitude, constant frequency source 26. Since the components of the relay are so arranged that the movable arm will dwell equally upon the stationary contacts when the relay is energized, the output voltage will be of square wave shape.

Modulators 431 and 432 are similar to modulator 430 and operate in the same manner.

Filter amplifier 433 is a voltage and power amplifier which is frequency selective in nature. With a square wave input of low amplitude, it is designed to provide a sinusoidal voltage output of a level equal to the power output of the synchro transmitter stator winding. The gain of filter amplifier 433 is stable at the desired value, and its frequency characteristics are such that a flat response over the range of frequencies necessary for the transmission of intelligence is obtained, with the frequency response dropping off sharply above and below this range. This is accomplished by the use of a frequency responsive feedback circuit within the amplifier and the tuning of output transformer 488 with the series combination of resistor 489 and capacitor 490. To further flatten the peak of the frequency response and to provide overall gain stabilization, a feedback loop is provided from the output to input through the attenuation path formed by resistors 491 and 492.

The purpose of filter-amplifiers 433, 434 and 435 is to change the square wave outputs of the modulators 430, 431 and 432 into sinusoidal wave forms with amplitudes corresponding to the amplitudes from the synchro transmitter stator winding 41. Referring to Fig. 10A, the filter-amplifier 433 comprises a filter section containing triodes 493, 494 and 495, an equalizer section utilizing triodes 495 and 496, a power amplifier containing pentodes 497, 498, 499 and 500, and output transformer 488, together with the resistors and capacitors associated with each tube. The filter section, which contains triodes 493, 494 and 495 is connected and operates in a manner similar to the filter 278 of reference monitor 15 hereinbefore described. Triode 493 is connected to grid resistor 501, plate load resistor 502 and coupling capacitor 503. Triode 494 is connected to grid resistor 504, plate load resistor 507. The common cathode load resistor 508 is connected between the low side of the regulated voltage supply 212 and the junction of grid resistors 501, 504 and cathode bias resistor 507. The input from modulator 430 is impressed across resistors 501 and 508, while the outputs of triodes 493 and 494 are impressed upon equalizer triodes 495 and 496. A feedback path from the plate of triode 495 to triode 494 extends through coupling capacitor 509, a parallel T network and capacitor 510. The parallel T network consists of resistors 511, 512 and 513 and capacitors 514, 515 and 516. Equalizer triode 495 is connected to grid resistor 517, plate load resistor 518, and coupling capacitor 519. In a similar manner, equalizer triode 496 is connected to grid resistor 520, plate load resistor 521 and coupling capacitor 522. The cathodes of triodes 495 and 496 are connected together and to a common cathode bias resistor 523 and thence to a common cathode load resistor 524.

Considering the operation of the circuits just described, triodes 493 and 494 form a phase invertor operating similarly to triodes 109 and 110 of phase invertor 46. For the purpose of understanding more readily the operation of the filter amplifier, it should be noted that within the limits of operation of this circuit in this application the circuit elements behave in a manner suitably approximating linear elements so that the principle of superposition may be applied. Thus, consider triodes 493 and 494 as having three inputs, the incoming square wave signal from the modulator 430 to the grid of triode 493 for which signal triode 494 acts as it would were the grid returned to the low side of the regulated supply through capacitor as set forth in the description of phase invertor 46. Next consider the square wave signal amplified by triode 493 and coupled to triode amplifier 495 through capacitor 503. Triode amplifiers 495 and 496 act as an equalizer amplifier in a manner similar to triodes 118 and 119 previously described. The signal appearing at the plate of triode 495 is coupled to the frequency selective parallel T network which rejects all frequencies other than the fundamental of the square wave from the modulator 430. The phase relation is such that a positively increasing signal on the grid of triode 493 when amplified through triode 495 and fed back through the frequency selective network will cause a positively increasing voltage on the grid of triode 494 and in consequence will cause the cathode voltage to rise. As the cathodes of triodes 493 and 494 are connected together, the positive increasing cathode of triode 493 caused by feedback reduces the effect of the positive increasing signal from the modulator 430. Thus the circuit gain is reduced for those frequencies passed by the parallel T filter network.

The outputs of the equalizer triodes 495 and 496 are impressed upon the power pentodes. Pentodes 497 and 498 are connected in parallel, as are pentodes 499 and 500. Parallel pentodes 497 and 498 and parallel pentodes 499 and 500 are connected in push-pull so as to drive output transformer 488. Resistors 525 and 526 are grid return resistors. Resistor 527 is the common cathode bias resistor, and capacitor 528 is the common cathode bypass capacitor. The screen grids of all four power pentodes are connected together and to the unregulated voltage supply 274 through screen voltage dropping resistor 529. Capacitor 530 is the screen grid bypass capacitor. The primary winding of output transformer 488 is in parallel with an impedance consisting of capacitor 490 and resistor 489. This impedance serves two purposes in that in addition to lowering the voltage impressed upon the winding at high frequencies below that which might be injurious to the pentodes, it improves the frequency response of the filter-amplifier so that small changes in the frequency of the signal voltage will not cause amplitude phase errors in the output. The output of filter-amplifier is taken from across the secondary winding of transformer 488 and is supplied to the stator 531 of synchro receiver 20. It should be noted also that a portion of the output signal is fed back to the input of the filter-amplifier, by means of the voltage divider 491—492 connected across the secondary of the output transformer, to reduce the gain of the entire circuit and to improve its stability and regulation.

Filter-amplifiers 434 and 435 are similar in construction and operation to filter-amplifier 433 described above, and likewise furnish output voltages to the stator of synchro receiver 20.

Thus there are obtained three sinusoidal signals that have voltages of varying amplitudes depending upon the position of the rotor of synchro transmitter 1 and similar to the voltages obtained from the stator windings 41 of synchro transmitter 1, and these three voltages are applied to the stator windings 531 of synchro receiver 20.

Synchro duplicators 24 and 25 are identical in construction and operation to synchro duplicator 23. Thus the square wave signals obtained from channel monitors 18 and 19 are converted into three wire, constant frequency, variable amplitude signals that are duplicates of the output voltages obtained from the stator windings of synchro transmitters 2 and 3, and the output voltages of synchro duplicators 24 and 25 are supplied to the stators of synchro receivers 21 and 22.

*The audio monitor*

The function of the audio monitor 32 (Figs. 2 and 11) is to raise the level of the audio output obtained from preamplifier 190 to that required to drive a loudspeaker and to provide a suitable reproduction of the audible signal impressed upon the recording tape by the action of programmer 31. This object is accomplished through the use of a conventional two stage audio amplifier consisting of pentodes 532 and 533 and their associated components and loudspeaker 534. The output of preamplifier 190 is impressed across input potentiometer 535 for pentode 532, the potentiometer serving as a volume control. Amplifier pentode 532 is further connected to cathode bias resistor 536, cathode bypass capacitor 537, plate load resistor 538, screen decoupling capacitor 539, screen voltage dropping resistor 540, screen decoupling capacitor 541 and high frequency bypass capacitor 542 which serves to improve the frequency response of the circuit. Amplifier pentode 533 is connected to grid resistor 543, cathode bias resistor 544 and cathode bypass capacitor 545. The plate load for amplifier 533 is the primary winding of transformer 546. The plate is also connected to high frequency bypass capacitor 547 which is returned to regulated voltage supply 212. The voltage appearing across the secondary winding of transformer 546 drives loudspeaker 534. Jacks may also be provided so that the audio signals from the audio monitor may be used to drive other receiving equipment.

*General description of multiplex system of Figs. 13 and 14*

In Figs. 13 and 14, there is illustrated a complete recording and reproducing system which operates according to the broad principles of the system hereinbefore described but which is adapted for multiplex operation so that the signal may be recorded on a single channel or track of the recording medium such as a magnetic tape. As in the previously described system, the three-wire variable amplitude signal from each synchro transmitter is impressed upon a synchro converter which converts the signal into a two-wire constant-amplitude variable phase signal. In this instance, however, the signals from the synchro converters and the signal from the reference signal generator are supplied to a pulse former which produces pulses from said signals. These pulses are supplied to a commutator which channels them as a series into a gate from whence they are supplied to the recording head.

In the reproducing system, the pulses are utilized to reconstitute square wave signals which are used to drive the synchro duplicators which function as in the first-described system to supply voltages to the synchro receivers corresponding to those produced by the synchro transmitters.

*Detailed description of multiplex system*

Referring now to Fig. 13, it can be seen that the apparatus there represented is capable of recording the information from six synchro transmitters 548 to 553. This is for the purpose of explanation only, as the method herein described will operate with more or less than six synchro channels of intelligence.

A constant frequency, constant voltage, alternating current power supply 554 is connected to the rotor windings of synchro transmitters 548 to 553 and is likewise impressed upon reference square wave generator 555. The output of reference square wave generator 555 is a voltage of square wave shape which is fixed in phase relation with the sinusoidal excitation voltage supplied to the rotor windings of synchro transmitters 548 to 553 from A.C. power supply 554. The rotors of synchro transmitters 548 to 553 are mechanically connected to moving parts or components of driving machine 556 through mechanical linkages 557 to 562, respectively. While the driving machine 556 is represented as one machine, it may consist of several independent or related machines or devices, or coarse and/or vernier control systems. The mechanical linkages 557 to 562 may be through direct coupling or gear boxes, clutch mechanisms and the like.

The output voltage appearing across the stator windings of synchro transmitters 548 to 553 will be three-wire constant-phase variable-amplitude signals, the relation of the amplitudes across the three stator windings of each synchro transmitter being indicative of the physical position of each synchro rotor. These synchro transmitter output signals are impressed upon synchro convertors 563 to 568, respectively. Each synchro convertor changes the three-wire constant-phase variable-amplitude signal it receives into a two-wire constant-amplitude variable-phase square wave output. The phase of each square wave with respect to the phase of the square wave output of the reference square wave generator 555 is indicative of the position of the rotor in the corresponding synchro transmitter.

The programmer 569 may be any circuit yielding a modulated pulsed output. This programming channel is included so that valuable data incidental to synchro data and necessary for its interpretation may be simultaneously recorded.

The multiplex magnetizer, the operation of which is hereinafter described, includes pulse former 570, commutator 571, 15.36 kc. oscillator 572, gate 573, power amplifier 574 and recording head 575.

The phase modulated outputs of synchro convertors 563 to 568 and programmer 569 are impressed upon pulse former 570. Pulse former 570 consists of several similar pulse forming circuits, one for each channel of intelligence. The circuits of pulse former 570, which receive their inputs from synchro convertors 563 to 568 and programmer 569, are identical and are designed so that each yields a pulse of 100 microseconds duration per cycle of the 60 cycle phase modulated square wave.

The output of the reference square wave generator 555 and the several outputs of pulse former 570 are fed into commutator 571 which connects the signals from each of the eight channels in succession to the gate 573 for a period of 1/60 second. Commutator 571 may be a mechanical or electronic unit. For the embodiment described, the mechanical commutator would have 8 segments each making contact during approximately 45° of arc and the speed of rotation would be synchronous with the supply voltage at 450 r.p.m. Gate 573 also has impressed upon it the sinusoidal output signal from 15.36 kc. oscillator 572, which is an oscillator of low stability that is synchronized to the reference voltage from reference square wave generator 555. Gate 573 permits a small amount of 15.36 kc. signal to pass at all times. When the reference pulse is impressed upon the gate for 1/120 of a second, 128 cycles of the 15.36 kc. signal will pass through the gate 573 at a high amplitude. When each of the 100 microseconds pulses from each of the phase modulated channels is impressed upon the gate, one cycle of the 15.36 kc. signal will pass through at a high amplitude. Thus a train of pulses will be impressed upon power amplifier 574; there will be a reference pulse followed by the seven pulses of equal amplitude but shorter duration. The interval of time between the reference pulse and each of the seven pulses corresponding to the phase modulated square waves will be indicative of the phase of each of those square waves. Through switch 576, the output of power amplifier 574 is impressed upon recording head 575 and thence to magnetic medium 577. The output of power amplifier 574 is of a sufficient level to saturate the magnetic medium during the periods that reference and channel pulses are impressed upon it.

Fig. 15 shows several possible wave forms throughout the multiplex magnetizer for a given set of synchro rotor positions. A–555 represents the output of reference square wave generator 555. A–563 to A–569, inclusive, represent the phase-modulated outputs of synchro converters 563 to 568 and program circuit 569. Wave forms B–555 and B–563 to 569 represent the several inputs to commutator 571. Wave form C–571 represents the output of commutator 571. D–572 is representative of the 15.36 sine wave output from 15.36 kc. oscillator 572. Wave form E–573 represents the output of gate 573 and is the signal which is ultimately impressed upon magnetic medium 577.

To provide additional program information, provisions are made to switch the recording head to microphone 578, preamplifier 579, R.F. bias supply 580 and power amplifier 581, which are connected as a conventional magnetic sound recorder. This circuit may be used to record additional audio signals.

In the reproducing system (Fig. 14) magnetic medium 577, which may be tape, wire, or other magnetic recording material, passes over pick-up head and amplifier 582. The signal reproduced from magnetic medium 577 will be the derivative of the recorded signal. Thus the output of pick-up head and amplifier 582 will be a 15.36 kc. sine wave with certain portions of that wave of larger amplitude.

The multiplex regenerator, described below, includes the following components: pick-up head and amplifier 582, 15.36 kc. filter 583, pulse former 584, clipper-limiter 585, pulse former 586, start pulse selector 587, reset 588, commutator 589 and scale of $\frac{1}{256}$ counters 590 to 596.

The output of pick-up head and amplifier 582 is impressed upon 15.36 filter 583, the output of which is a 15.36 kc. time base signal. Filter 583 is of medium Q so that its output will be continuous in the event that there is a momentary interruption of the input signal. The output of filter 583 is impressed upon 15.36 kc. pulse former 584 which reforms the wave shape of its input signal to yield a signal of amplitude and wave shape appropriate for driving counter circuits 590 to 596. Since these counter circuits have a scale of $\frac{1}{256}$ their output will be a 60 cycle per second square wave when the input pulse signal has a frequency of 15.36 kc.

The output signal from pick-up head and amplifier 582 is also applied to clipper-limiter 585 which serves to reform the reference pulse and the seven modulated pulses of shorter duration. These pulses are then impressed upon pulse former 586 which yields a series of corresponding pulses suitable for driving start pulse selector 587 and commutator 589.

Start pulse selector 587 is a circuit sensitive to the relatively long reference pulse but unaffected by the pulses of shorter duration corresponding to the phase modulated signals. Each time that the reference pulse is impressed upon start pulse selector 587, a similarly pulsed output signal will be applied to reset 588.

Since the synchro transmitters 548 to 533 are energized with a voltage having a frequency of 60 cycles per second and there are eight channels of information, including the reference signal, a pulse representative of each of these eight signals will appear in the train of pulses 7.5 times per second.

Reset 588 is a binary counter having a scale of $\frac{1}{2048}$. When the 15.36 kc. signal from 15.36 kc. pulse former 584 is impressed upon reset 588, the signal appearing at the output of reset 588, will be a square wave having a frequency of 7.5 cycles per second. The signal from start pulse selector 587 corresponding to the reference pulse is used to synchronize the output of reset 588 with the recorded reference signal. Reset 588, a binary counter having a scale of $\frac{1}{2048}$, is tapped at a scale of $\frac{1}{256}$ to yield the 60 cycle square wave voltage necessary to drive reference three-phase generator 597.

The output of pulse former 586 is impressed upon commutator 589, which transmits one pulse representing the phase of a given channel 7.5 times each second. This pulse is fed into the reset input of the counter for that channel, starting that channel from zero. The operation of commutator 589 is properly synchronized by the 7.5 cycle per second square wave output from reset 588.

Since the primary input to counters 590 to 596 is the 15.36 kc. output from 15.36 kc. pulse former 584, the resultant output of each counter will be a 60 cycle per second square wave voltage. The square wave voltage from a given counter will continue at a fixed phase with respect to the time base until that counter is reset with a pulse of difference phase.

It is in this manner that square wave voltages of varying phase are obtained. The manner in which the phase of each output signal from counters 590 to 596 varies will be identical with the change of phase that occurred in the several output voltages from synchro convertors 563 to 568 and programmer 569.

Reference three-phase generator 597 when energized with the 60 cycle per second square wave from reset 588 generates three output voltages each differing in phase from the other by 120 degrees. This generator may be similar to that employed in the first-described system.

Synchro duplicators 598 to 603 are fed with output phase modulated square waves from counters 590 to 596, respectively, and the three-phase reference voltage from reference three-phase generator 597 and the required modulating voltage from A.C. power source 604. The output of each synchro duplicator will be a three-wire constant-phase variable amplitude signal which is identical with the signal from the stator winding of the synchro transmitter which was impressed upon the corresponding synchro convertor. The outputs from the synchro duplicators may be used in any manner that the outputs from the stator windings of synchro transmitters 548 to 553 may be used. In the illustrated system, these outputs are used to energize the stator windings of synchro receivers 605 to 610 to cause the rotor shafts of the synchro receivers to occupy positions identical with the positions occupied by the rotor shafts of synchro transmitters 548 to 553, respectively.

The square wave voltage from counter 596 may be fed into program receiver 611, which may be any circuit or device suitable for utilizing a phase-modulated signal of the type here transmitted. For example, program receiver 611 may be an indicating device, a computing mechanism or a control or other mechanism.

Fig. 15 shows voltage wave forms occurring at various points in the multiplex regenerator for the given conditions represented by the wave forms previously mentioned. Wave form F–582 represents the output voltage of pick-up head and amplifier 582. Wave form G–584 represents the output voltage of 15.36 kc. pulse former 584, a 15.36 kc. square wave. Wave form H–586 represents the output voltage of pulse former 586. J–587 is representative of the output voltage from start pulse selector 587. K–588 represents the output of reset 588 which properly synchronizes the action of commutator 589. Wave forms L–590 to L–596 represent the voltages appearing at the several outputs of commutator 589 and applied to counters 590 to 596. M–588 is representative of the reference voltage obtained from the 1/256 tap of reset 588. Wave forms N–590 to N–596 are the output voltages obtained from counters 590 to 596 and are identical with the phase modulated square waves shown in Fig. 15 as wave forms A–563 to A–569.

Switch 612 may be thrown to the audio position thus connecting the output of the pick-up head and amplifier 582 to audio amplifier 613 and speaker 614 or other appropriate audio frequency receiving circuits for the reproduction of audio recorded audio signal.

It is to be understood that the embodiments illustrated and described are for the purpose of illustration, and that such modifications and other embodiments as may occur to those skilled in the art are contemplated by the invention.

While the foregoing detailed description has been with reference to a particular use, the invention is intended broadly for use in engineering analyses of problems where the relationship of two or more variables as a function of time is of primary concern. A method for transmitting such data from one point to another in common use today is to convert the data to electrical synchro signals. It is expected that this invention will first find application in the analysis of systems where data is presently available as synchro signals. However, it is not intended to limit the use of the invention to any specific application. An example of a field where the use of synchro data is widespread is military ordnance fire control. Such quantities as the gun position (bearing and elevation), fuse setting (seconds), speed of target (miles per hour) and other significant information is frequently carried from point to point as synchro voltages.

Applications where use is made of the fact that the reproducer reconstructs the signal from sinusoidal waves are too complex to present here in detail although the possibilities may be grasped easily from reviewing the form in which the intelligence appears at the few important points. Let two input quantities be $\psi$ and $\phi$; then they may be caused to appear in the Data Reproducer when suitable interconnections are made between the units as:

(1) Themselves ($\psi$ or $\phi$) or their sum or difference ($\pm(\psi\pm\phi)$) as direct voltages or as a modulated A.C. carrier or as sets of synchro voltages.
(2) Sinusoidal functions of $\psi$ or $\phi$ (sin $\phi$, cos $\psi$, etc.) or sinusoidal functions of the sums or difference (i.e., sin ($\psi-\phi$), etc.).
(3) As trigonometric relationships may be used to express products or sinusoids as sums of sinusoids of trigonometric functions, the products of sines and cosines of $\psi$ and $\phi$ may be obtained.

I claim:

1. Apparatus for recording data which may be represented as a function of an angle, comprising means for generating a square wave reference signal of constant phase, means for producing a plurality of sinusoidal voltages of like phase corresponding to the phase of said reference signal but whose respective amplitudes vary according to the cosine of said angle plus a constant, which constant is different for each of the said sinusoidal voltages related to a given angle, means for shifting relatively the phases of said voltages to effect phase displacement thereof with respect to one another by amounts related to the constants added to said angle, means for adding the phase-displaced voltages to produce a resultant sinusoidal voltage of varying phase according to said data, means for converting said resultant voltage to a square wave information signal whose phase relation to said square wave reference signal varies according to said data, and means for recording intelligence concerning the varying phase relationship of said signals.

2. Apparatus for recording data which may be represented as a function of an angle, comprising means for generating a square wave reference signal of constant phase, means for producing a plurality of sinusoidal voltages of like phase corresponding to the phase of said reference signal but whose respective amplitudes vary according to the cosine of said angle plus a constant, which constant is different for each of the said sinusoidal voltages related to a given angle, means for shifting relatively the phases of said voltages to effect phase displacement thereof with respect to one another by amounts related to the constants added to said angle, means for adding the phase-displaced voltages to produce a resultant sinusoidal voltage of varying phase according to said data, means for converting said resultant voltage to a square wave information signal whose phase relation to said square wave reference signal varies according to said data, and means for magnetically recording said signals on different tracks of a magnetic recording medium.

3. Apparatus for recording data which may be represented as a function of an angle, comprising means for generating a square wave reference signal of constant phase, means for producing a plurality of sinusoidal voltages of like phase corresponding to the phase of said reference signal but whose respective amplitudes vary according to the cosine of said angle plus a constant, which constant is different for each of the said sinusoidal voltages related to a given angle, means for shifting relatively the phases of said voltages to effect phase displacement thereof with respect to one another by amounts related to the constants added to said angle, means for adding the phase-displaced voltages to produce a resultant sinusoidal voltage of varying phase according to said data, means for converting said resultant voltage to a square wave information signal whose phase relation to said square wave reference signal varies according to said data, means for producing pulses from said signals in time sequential relation corresponding to the varying phase relation of said signals, and means for magnetically recording said pulses on a single track of a magnetic recording medium.

4. In a system for producing signal intelligence concerning rotary motion, a constant frequency power source, a square wave reference signal generator connected to said source to be driven thereby, a transmitter having wound rotor and stator, one having a single winding and the other having a multiple winding, means electrically connecting said single winding to said source, whereby to produce an output from said multiple winding in response to rotary movement of said rotor, and means for converting the output of said multiple winding into a square wave signal whose phase varies in relation to said reference signal according to the rotary movement of said rotor.

5. In a system for producing signal intelligence concerning rotary motion, a constant frequency power source, a square wave reference signal generator connected to said source to be driven thereby, a transmitter having a wound rotor and stator, one having a single winding and the other having a multiple winding with its several windings equally spaced about the center of rotation, means electrically connecting said single winding to said source, whereby rotary movement of said rotor produces output voltages from said multiple winding which are of like phase but of varying amplitudes, means for shifting relatively the phases of said voltages to effect phase displacement thereof with respect to one another by amounts equal to the angular spacing about the axis of rotation of the several windings of the multiple winding, means for adding the phase-displaced voltages to produce a resultant sinusoidal voltage of phase varying according to the rotary movement of said rotor, and means for converting said resultant voltage into a square wave signal whose phase varies in relation to said reference signal according to the rotary movement of said rotor.

6. In a system for producing rotary motion from pulses some of which are reference pulses while others are information pulses whose phase relation to the reference pulses varies according to the desired rotary motion, means for producing from the reference pulses three sinusoidal voltages phase-displaced equally with respect to one another, means for producing from the information pulses a square wave signal, three gate circuits, means for supplying said phase-displaced sinusoidal voltages to said gate circuits, means for applying said square wave signal to said gate circuits, so as to effect transfer therein of portions of the sinusoidal voltages, means for integrating the transferred portions to produce D.C. voltages, a constant frequency power source, means for modulating the D.C. voltages from said power source to form square wave voltages, means for converting the latter voltages into sinusoidal voltages, a synchro receiver having a three-winding stator, and means for supplying the last-recited sinusoidal voltages to said stator.

7. Apparatus for recording operational data and programming data on a single recording medium, which comprises means for generating a square wave reference signal of constant phase, means for producing from the operational data a square wave signal whose phase relation to said reference signal varies as the analog value of the generated signal according to the operational data, means for producing a signal representative of the programming data, and means for recording said signals on the recording medium.

8. Apparatus for recording data which is a function of an angle, comprising means for producing a plurality of sinsusoidal voltages of like phase but whose respective amplitudes vary according to the cosine of said angle plus a constant, which constant is different for each of the said sinusoidal voltages related to a given angle, means for shifting relatively the phases of said voltages so that they differ in phase from one another by amounts related to the constants added to said angle, means for adding the phase-displaced voltages to produce a resultant sinusoidal voltage whose phase varies according to said data, means for converting said resultant voltage to a square wave signal whose phase varies according to said data, and means for recording the phase variations of said signal.

9. Apparatus for translation of intelligence represented by a plurality of sinusoidal voltages of like phase but whose respective amplitudes vary sinusoidally relative to said intelligence, comprising means for producing a reference signal of constant phase, means for shifting relatively the phases of said voltages so that they differ in phase from one another by equal amounts, and means for adding said voltages to produce a resultant sinusoidal voltage whose phase varies according to said intelligence in relation to said reference signal.

10. Apparatus for translation of intelligence represented by a plurality of sinusoidal voltages of like phase but whose respective amplitudes vary sinusoidally relative to said intelligence, comprising means for producing a square wave reference signal of constant phase, means for shifting relatively the phases of said voltages so that they differ in phase from one another by equal amounts, means for adding said voltages to produce a resultant sinusoidal voltage whose phase varies according to said intelligence, and means for converting said resultant voltage to a square wave signal whose phase varies according to said intelligence in relation to said square wave reference signal.

11. In a system for recording data concerning motion of a machine part, a constant frequency power source, a square wave reference signal generator connected to said source to be driven thereby, a synchro transmitter having a rotor and a three-winding stator, means electrically connecting said rotor to said source, means mechanically connecting said rotor to the machine part to effect rotary movement of said rotor according to the motion of said part, the rotary movement of said rotor producing three output voltages from said stator which are of like phase but of varying amplitudes, means for shifting relatively the phases of said voltages to effect phase displacement thereof with respect to one another by equal amounts, means for adding the phase-displaced voltages to produce a resultant sinusoidal voltage of varying phase according to the rotary movement of said rotor, means for converting said resultant voltage into a square wave signal whose phase varies in relation to said reference signal according to the rotary movement of said rotor, and means for recording said signals.

12. In a system for recording data concerning the movements of parts of a machine, a constant frequency power source, a square wave reference signal generator connected to said source to be driven thereby, a plurality of synchro transmitters each having a rotor and a stator, means electrically connecting the rotors to said source, means mechanically connecting the rotors respectively to the machine parts, a plurality of synchro converters connected respectively to the stators of said transmitters, each synchro converter being adapted to produce a square wave signal whose phase varies in relation to said reference signal according to the movement of the associated transmitter rotor, and means for recording said reference signal and the signals produced by the synchro converters.

13. In a system for producing rotary motion from pulses some of which are reference pulses while others are information pulses whose phase relation to the reference pulses varies according to the desired rotary motion, means for producing from the reference pulses a plurality of sinusoidal voltages phase-displaced equally with respect to one another, means for producing from the information pulses a square wave signal, means for producing from the phase-displaced sinusoidal voltages and from the square wave signal as many sinusoidal voltages of like phase as there are sinusoidal voltages phase-displaced equally with respect to one another but of relatively varying amplitudes according to the information represented by said square wave signal, a synchro receiver having a multi-winding stator having as many windings as there are sinusoidal voltages, and means for supplying the last-recited sinusoidal voltages to said stator.

14. In a system for producing useful voltages from pulses some of which are reference pulses while others are information pulses whose phase varies in relation to the reference pulses, means for producing from the reference pulses a plurality of sinusoidal voltages phase-displaced equally with respect to one another, means for producing from the information pulses a square wave signal, and means for producing from the phase-displaced sinusoidal voltages and from the square wave signal as many sinusoidal voltages as there are sinusoidal phase-displaced voltages, said sinusoidal voltages from the square wave being of like phase but of relatively varying amplitudes according to the information represented by said square wave signal.

15. In a system for producing useful voltages from pulses some of which are reference pulses while others are information pulses whose phase varies in relation to the reference pulses, means for producing from the reference pulses a plurality of sinusoidal voltages phase-displaced equally with respect to one another, means for producing from the information pulses a square wave signal, as many gate circuits as there are sinusoidal phase-displaced voltages, means for supplying said phase-displaced sinusoidal voltages to said gate circuits, means for applying said square wave signal to said gate circuits, so as to effect transfer therein of portions of the sinusoidal voltages, means for integrating the transferred portions to produce D.C. voltages, a constant frequency power source, means for modulating the D.C. voltages from said power source to form square wave voltages, and means for converting the latter voltages into sinusoidal voltages.

16. In a system for producing rotary motion from pulses some of which are reference pulses while others are information pulses whose phase relation to the reference pulses varies according to the desired rotary motion, means for producing from the reference pulses a plurality of phase-displaced sinusoidal voltages, means for producing from the information pulses a square wave signal, a plurality of gate circuits, means for supplying said phase-displaced sinusoidal voltages to said gate circuits, means for applying said square wave signal to said gate circuits, so as to effect transfer therein of portions of the sinusoidal voltages, means for integrating the transferred portions to produce D.C. voltages, a constant frequency power source, means for modulating the D.C. voltages from said power source to form square wave voltages, means for converting the latter voltages into sinusoidal voltages, a receiver device operable by the last-recited sinusoidal voltages to produce rotary motion, and means for supplying the last-recited sinusoidal voltages to said receiver device.

17. In a system for producing rotary motion from pulses some of which are reference pulses while others are information pulses whose phase relation to the reference pulses varies according to the desired rotary motion, means for producing from the reference pulses a plurality of phase-displaced sinusoidal voltages, means for producing from the information pulses a square wave signal, means for producing from the phase-displaced sinusoidal voltages and from the square wave signal a plurality of sinusoidal voltages of like phase but of relatively varying amplitudes according to the information represented by said square wave signal, a receiver device operable by the last-recited sinusoidal voltages to produce rotary motion, and means for supplying the last-recited sinusoidal voltages to said receiver device.

18. In a system for producing useful voltages from pulses some of which are reference pulses while others are information pulses whose phase varies in relation to the reference pulses, means for producing from the reference pulses a plurality of phase-displaced sinusoidal voltages, means for producing from the information pulses a square wave signal, and means for producing from the phase-displaced sinusoidal voltages and from the square wave signal a plurality of sinusoidal voltages of like phase but of relatively varying amplitudes according to the information represented by said square wave signal.

19. In a system for producing useful voltages from pulses some of which are reference pulses while others are information pulses whose phase varies in relation to the reference pulses, means for producing from the reference pulses a plurality of phase-displaced sinusoidal voltages, means for producing from the information pulses a square wave signal, a plurality of gate circuits, means for supplying said phase-displaced sinusoidal voltages to said gate circuits, means for applying said square wave signal to said gate circuits, so as to effect transfer therein of portions of the sinusoidal voltages, means for integrating the transferred portions to produce D.C. voltages, a constant frequency power source, means for modulating the D.C. voltages from said power source to form square wave voltages, and means for converting the latter voltages into sinusoidal voltages.

20. A system for accomplishing a plurality of operations comprising means for producing an operational signal, a plurality of means each responsive to the operational signal and each adapted to assume successively various analog positions corresponding to the intelligence from successive elements of the operational signal to perform specific operations, means for producing a programing signal distinct from the operational signal, and means responsive to the programing signal to successively select the different responsive means to respond to the operational signal at successive times.

21. The system of claim 20, wherein the means responsive to the operational signal comprises a unitary recording medium for recording a signal representative of operational data and a signal representative of programing data together on the single recording medium.

References Cited in the file of this patent

UNITED STATES PATENTS

| | | |
|---|---|---|
| 2,313,136 | Fischer | Mar. 9, 1943 |
| 2,457,819 | Hoeppner | Jan. 4, 1949 |
| 2,475,245 | Leaver | July 5, 1949 |
| 2,537,770 | Livingston | Jan. 9, 1951 |
| 2,567,862 | Van Voorhis | Sept. 11, 1951 |
| 2,609,143 | Stibitz | Sept. 2, 1952 |
| 2,625,600 | Benaglio | Jan. 13, 1953 |
| 2,736,007 | Kenyon | Feb. 21, 1956 |
| 2,750,566 | Westcott | June 12, 1956 |